United States Patent
Cheng et al.

(10) Patent No.: US 12,204,109 B2
(45) Date of Patent: *Jan. 21, 2025

(54) WIDE ANGLE AND HIGH RESOLUTION TILED HEAD-MOUNTED DISPLAY DEVICE

(71) Applicants: Arizona Board of Regents on behalf of the University of Arizona, Tucson, AZ (US); BEIJING INSTITUTE OF TECHNOLOGY, Beijing (CN)

(72) Inventors: Dewen Cheng, Beijing (CN); Yongtian Wang, Beijing (CN); Hong Hua, Tucson, AZ (US)

(73) Assignee: The Arizona Board of Regents on Behalf of the University of Arizona, Tucson, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/123,503

(22) Filed: Mar. 20, 2023

(65) Prior Publication Data

US 2023/0333387 A1   Oct. 19, 2023

Related U.S. Application Data

(63) Continuation of application No. 17/065,788, filed on Oct. 8, 2020, now Pat. No. 11,609,430, which is a
(Continued)

(51) Int. Cl.
*G09G 5/00*     (2006.01)
*G02B 5/04*     (2006.01)
*G02B 27/01*    (2006.01)

(52) U.S. Cl.
CPC ............ *G02B 27/0172* (2013.01); *G02B 5/04* (2013.01); *G02B 2027/011* (2013.01); *G02B 2027/0123* (2013.01); *G02B 2027/0147* (2013.01)

(58) Field of Classification Search
CPC .................. G02B 27/0172; G02B 5/04; G02B 2027/011; G02B 2027/0123; G02B 2027/0147
(Continued)

(56) References Cited

U.S. PATENT DOCUMENTS 3,493,290 A   2/1970   Traub
3,632,184 A   1/1972   King
(Continued)

FOREIGN PATENT DOCUMENTS

AU   2019204862        7/2019
CN   1252133 A         5/2000
(Continued)

OTHER PUBLICATIONS

Armitage, David, Ian Underwood, and Shin-Tson Wu. Introduction to Microdisplays. Chichester, England: Wiley, 2006.
(Continued)

*Primary Examiner* — Jennifer T Nguyen
(74) *Attorney, Agent, or Firm* — Niels Haun; Dann, Dorfman, Herrell & Skillman, P.C.

(57) ABSTRACT

A tiled head-mounted display device, comprising: an optical component including a plurality of prisms with free-form surfaces, each prism being a wedge prism comprising a first optical surface, a second optical surface and a third optical surface; and a display component including a plurality of micro-displays, wherein the number of the micro-displays and the number of the prisms with free-form surfaces is identical. The tiled head-mounted display device according to the present invention is compact and light, provides wide field of view and high resolution, especially for the optical tiling head-mounted display device, the exit pupil planes of each display channels are coincident, thus avoiding pupil aberration and keeping exit pupil diameter and eye clearance same as the single ocular. There is no resolution variance
(Continued)

throughout the entire field of view, thus preventing extra trapezoid distortion. The tiled head-mounted display device according to the present invention can be readily applicable to augmented environments applications by simply adding an auxiliary free-form lens behind the free-form prism.

8 Claims, 15 Drawing Sheets

Related U.S. Application Data continuation of application No. 16/366,204, filed on Mar. 27, 2019, now Pat. No. 10,809,533, which is a continuation of application No. 14/953,563, filed on Nov. 30, 2015, now Pat. No. 10,281,723, which is a continuation of application No. 13/695,069, filed as application No. PCT/CN2010/072376 on Apr. 30, 2010, now Pat. No. 9,244,277.

(58) Field of Classification Search
USPC .......................................................... 345/1
See application file for complete search history.

(56) References Cited

U.S. PATENT DOCUMENTS

| | | |
|---|---|---|
| 3,992,084 A | 11/1976 | Nakamura |
| 4,468,101 A | 8/1984 | Ellis |
| 4,669,810 A | 6/1987 | Wood |
| 4,753,522 A | 6/1988 | Nishina |
| 4,863,251 A | 9/1989 | Herloski |
| 5,109,469 A | 4/1992 | Duggan |
| 5,172,272 A | 12/1992 | Aoki |
| 5,172,275 A | 12/1992 | Dejager |
| 5,416,315 A | 5/1995 | Filipovich |
| 5,436,763 A | 7/1995 | Chen |
| 5,526,183 A | 6/1996 | Chen |
| 5,572,229 A | 11/1996 | Fisher |
| 5,621,572 A | 4/1997 | Fergason |
| 5,625,495 A | 4/1997 | Moskovich |
| 5,699,194 A | 12/1997 | Takahashi |
| 5,701,202 A | 12/1997 | Takahashi |
| 5,706,136 A | 1/1998 | Okuyama |
| 5,818,632 A | 10/1998 | Stephenson |
| 5,880,711 A | 3/1999 | Tamada |
| 5,880,888 A | 3/1999 | Schoenmakers |
| 5,886,822 A | 3/1999 | Spitzer |
| 5,917,656 A | 6/1999 | Hayakawa |
| 5,959,780 A | 9/1999 | Togino |
| 6,008,781 A | 12/1999 | Furness |
| 6,023,373 A | 2/2000 | Inoguchi |
| 6,028,606 A | 2/2000 | Kolb |
| 6,034,823 A | 3/2000 | Togino |
| 6,198,577 B1 | 3/2001 | Kedar |
| 6,201,646 B1 | 3/2001 | Togino |
| 6,236,521 B1 | 5/2001 | Nanba |
| 6,239,915 B1 | 5/2001 | Takagi |
| 6,243,199 B1 | 6/2001 | Hansen |
| 6,271,972 B1 | 8/2001 | Kedar |
| 6,384,983 B1 | 5/2002 | Yamazaki |
| 6,396,639 B1 | 5/2002 | Togino |
| 6,404,561 B1 | 6/2002 | Isono |
| 6,404,562 B1 | 6/2002 | Ota |
| 6,433,376 B2 | 8/2002 | Kim |
| 6,433,760 B1 | 8/2002 | Vaissie |
| 6,493,146 B2 | 12/2002 | Inoguchi |
| 6,510,006 B1 | 1/2003 | Togino |
| 6,563,648 B2 | 5/2003 | Gleckman |
| 6,646,811 B2 | 11/2003 | Inoguchi |
| 6,653,989 B2 | 11/2003 | Nakanishi |
| 6,671,099 B2 | 12/2003 | Nagata |
| 6,731,434 B1 | 5/2004 | Hua |
| 6,829,113 B2 | 12/2004 | Togino |
| 6,963,454 B1 | 11/2005 | Martins |
| 6,999,239 B1 | 2/2006 | Martins |
| 7,152,977 B2 | 12/2006 | Ruda |
| 7,177,083 B2 | 2/2007 | Holler |
| 7,230,583 B2 | 6/2007 | Tidwell |
| 7,249,853 B2 | 7/2007 | Weller-Brophy |
| 7,405,881 B2 | 7/2008 | Shimizu |
| 7,414,791 B2 | 8/2008 | Urakawa |
| 7,522,344 B1 | 4/2009 | Curatu |
| 8,467,133 B2 | 6/2013 | Miller |
| 8,503,087 B1 | 8/2013 | Amirparviz |
| 8,511,827 B2 | 8/2013 | Hua |
| 9,201,193 B1 | 12/2015 | Smith |
| 9,239,453 B2 | 1/2016 | Cheng |
| 9,244,277 B2 | 1/2016 | Cheng |
| 9,310,591 B2 | 4/2016 | Hua |
| 9,720,232 B2 | 8/2017 | Hua |
| 9,753,286 B2 | 9/2017 | Gao |
| 9,791,700 B2 | 10/2017 | Schowengerdt |
| 9,874,760 B2 | 1/2018 | Hua |
| 10,281,723 B2 * | 5/2019 | Cheng ................ G02B 27/0172 |
| 10,326,983 B2 | 6/2019 | Hua |
| 10,469,833 B2 | 11/2019 | Hua |
| 10,495,859 B2 | 12/2019 | Hua |
| 10,593,507 B2 | 3/2020 | Hua |
| 10,598,939 B2 | 3/2020 | Hua |
| 10,739,578 B2 | 8/2020 | Hua |
| 10,805,598 B2 | 10/2020 | Hua |
| 10,809,533 B2 * | 10/2020 | Cheng ...................... G02B 5/04 |
| 10,969,592 B2 | 4/2021 | Hua |
| 11,150,449 B2 | 10/2021 | Hua |
| 11,181,746 B2 | 11/2021 | Hua |
| 11,350,079 B2 | 5/2022 | Hua |
| 11,546,575 B2 | 1/2023 | Hong |
| 11,609,430 B2 * | 3/2023 | Cheng ...................... G02B 5/04 |
| 2001/0009478 A1 * | 7/2001 | Yamazaki .......... G02B 27/0172 359/632 |
| 2001/0048561 A1 | 12/2001 | Heacock |
| 2002/0015116 A1 | 2/2002 | Park |
| 2002/0041446 A1 | 4/2002 | Nagaoka |
| 2002/0051299 A1 * | 5/2002 | Togino ............... G02B 27/0172 359/633 |
| 2002/0060850 A1 | 5/2002 | Takeyama |
| 2002/0063913 A1 | 5/2002 | Nakamura |
| 2002/0067467 A1 | 6/2002 | Dorval |
| 2002/0114077 A1 | 8/2002 | Javidi |
| 2002/0181115 A1 * | 12/2002 | Massof ................ G02B 27/017 359/630 |
| 2003/0076591 A1 | 4/2003 | Ohmori |
| 2003/0090753 A1 | 5/2003 | Takeyama |
| 2004/0136097 A1 | 7/2004 | Park |
| 2004/0164927 A1 | 8/2004 | Suyama |
| 2004/0196213 A1 | 10/2004 | Tidwell |
| 2004/0218243 A1 | 11/2004 | Yamazaki |
| 2004/0233551 A1 | 11/2004 | Takahashi |
| 2005/0036119 A1 | 2/2005 | Ruda |
| 2005/0179868 A1 | 8/2005 | Seo |
| 2005/0248849 A1 | 11/2005 | Urey |
| 2006/0028400 A1 | 2/2006 | Lapstun |
| 2006/0077558 A1 | 4/2006 | Urakawa |
| 2006/0119951 A1 | 6/2006 | Mcguire |
| 2007/0109505 A1 | 5/2007 | Kubara |
| 2007/0246641 A1 | 10/2007 | Baun |
| 2008/0036853 A1 | 2/2008 | Shestak |
| 2008/0094720 A1 | 4/2008 | Yamazaki |
| 2008/0291531 A1 | 11/2008 | Heimer |
| 2009/0115842 A1 * | 5/2009 | Saito .................... G02B 17/004 348/E13.001 |
| 2009/0153960 A1 * | 6/2009 | Inoguchi ............ G02B 27/0172 359/482 |
| 2009/0168010 A1 | 7/2009 | Vinogradov |
| 2009/0256943 A1 | 10/2009 | Kondo |
| 2010/0091027 A1 | 4/2010 | Oyama |
| 2010/0109977 A1 * | 5/2010 | Yamazaki .......... G02B 27/0172 345/8 |
| 2010/0208372 A1 | 8/2010 | Heimer |
| 2010/0271698 A1 | 10/2010 | Kessler |
| 2010/0289970 A1 | 11/2010 | Watanabe |
| 2011/0037951 A1 | 2/2011 | Hua |
| 2011/0043644 A1 | 2/2011 | Munger |

(56) References Cited

U.S. PATENT DOCUMENTS

| | | |
|---|---|---|
| 2011/0075257 A1 | 3/2011 | Hua |
| 2011/0090389 A1 | 4/2011 | Saito |
| 2011/0109880 A1 | 5/2011 | Nummela |
| 2011/0221656 A1 | 9/2011 | Haddick |
| 2012/0013988 A1 | 1/2012 | Hutchin |
| 2012/0019557 A1 | 1/2012 | Aronsson |
| 2012/0050891 A1 | 3/2012 | Seidl |
| 2012/0057129 A1 | 3/2012 | Durnell |
| 2012/0081800 A1 | 4/2012 | Cheng |
| 2012/0113092 A1 | 5/2012 | Bar-Zeev |
| 2012/0160302 A1 | 6/2012 | Citron |
| 2012/0162549 A1 | 6/2012 | Gao |
| 2012/0242697 A1 | 9/2012 | Border |
| 2012/0262802 A1 | 10/2012 | Huang |
| 2012/0320161 A1 | 12/2012 | Javidi |
| 2013/0100524 A1 | 4/2013 | Magarill |
| 2013/0112705 A1 | 5/2013 | Mcgill |
| 2013/0182317 A1 | 7/2013 | Takahashi |
| 2013/0187836 A1 | 7/2013 | Cheng |
| 2013/0222896 A1 | 8/2013 | Komatsu |
| 2013/0258461 A1 | 10/2013 | Sato |
| 2013/0285885 A1 | 10/2013 | Nowatzyk |
| 2013/0286053 A1 | 10/2013 | Fleck |
| 2013/0300634 A1 | 11/2013 | White |
| 2013/0329304 A1 | 12/2013 | Hua |
| 2014/0009845 A1 | 1/2014 | Cheng |
| 2014/0035959 A1 | 2/2014 | Paul |
| 2014/0049833 A1 | 2/2014 | Totani |
| 2014/0071539 A1 | 3/2014 | Gao |
| 2014/0085282 A1 | 3/2014 | Luebke |
| 2014/0139403 A1 | 5/2014 | Hiraide |
| 2014/0300869 A1 | 10/2014 | Hirsch |
| 2014/0347361 A1 | 11/2014 | Alpaslan |
| 2014/0361957 A1 | 12/2014 | Hua |
| 2015/0168802 A1 | 6/2015 | Bohn |
| 2015/0177445 A1 | 6/2015 | Takagi |
| 2015/0201176 A1 | 7/2015 | Graziosi |
| 2015/0208061 A1 | 7/2015 | Yang |
| 2015/0212321 A1 | 7/2015 | Zhao |
| 2015/0277129 A1 | 10/2015 | Hua |
| 2015/0346495 A1 | 12/2015 | Welch |
| 2015/0363978 A1 | 12/2015 | Maimone |
| 2016/0011419 A1 | 1/2016 | Gao |
| 2016/0085075 A1 | 3/2016 | Cheng |
| 2016/0239985 A1 | 8/2016 | Haddick et al. |
| 2016/0320620 A1 | 11/2016 | Maimone |
| 2017/0078652 A1 | 3/2017 | Hua |
| 2017/0102545 A1 | 4/2017 | Hua |
| 2017/0202633 A1 | 7/2017 | Liu |
| 2018/0045949 A1 | 2/2018 | Hua |
| 2018/0343434 A1 | 11/2018 | Perreault |
| 2019/0260982 A1 | 8/2019 | Hong |
| 2019/0346686 A1 | 11/2019 | Hua |
| 2020/0103654 A1 | 4/2020 | Cheng |
| 2020/0110250 A1 | 4/2020 | Hua |
| 2020/0192118 A1 | 6/2020 | Hua |
| 2020/0278550 A1 | 9/2020 | Hua |
| 2020/0386993 A1 | 12/2020 | Hua |
| 2020/0393676 A1 | 12/2020 | Hua |
| 2020/0393677 A1 | 12/2020 | Hua |
| 2021/0006773 A1 | 1/2021 | Hua |
| 2021/0014473 A1 | 1/2021 | Hua |
| 2021/0088795 A1 | 3/2021 | Cheng |
| 2021/0103148 A1 | 4/2021 | Hua |
| 2021/0255464 A1 | 8/2021 | Hong |
| 2022/0050299 A1 | 2/2022 | Hua |

FOREIGN PATENT DOCUMENTS

| | | |
|---|---|---|
| CN | 101359089 | 2/2009 |
| CN | 101424788 A | 5/2009 |
| CN | 103688208 | 3/2014 |
| CN | 110770633 | 2/2020 |
| CN | 110879468 | 3/2020 |
| CN | 110914741 | 3/2020 |
| EP | 0408344 | 1/1991 |
| EP | 1102105 | 5/2001 |
| FR | 2928034 | 8/2009 |
| JP | 02200074 | 8/1990 |
| JP | H03101709 | 4/1991 |
| JP | 08160345 | 6/1996 |
| JP | H09218375 A | 8/1997 |
| JP | H09297282 | 11/1997 |
| JP | H1013861 | 1/1998 |
| JP | H10307263 | 11/1998 |
| JP | H11326820 A | 11/1999 |
| JP | 2000501857 | 2/2000 |
| JP | 2000249974 | 9/2000 |
| JP | 2001013446 | 1/2001 |
| JP | 2001066543 A | 3/2001 |
| JP | 2001145127 | 5/2001 |
| JP | 2001238229 | 8/2001 |
| JP | 2002148559 | 5/2002 |
| JP | 2003241100 | 8/2003 |
| JP | 2006091333 | 4/2006 |
| JP | 2006276884 A | 10/2006 |
| JP | 2007101930 | 4/2007 |
| JP | 2010072188 | 4/2010 |
| JP | 2014505381 | 2/2014 |
| JP | 2016045644 | 4/2016 |
| JP | 2017518532 | 7/2017 |
| JP | 2018007110 | 1/2018 |
| WO | 9810402 | 3/1998 |
| WO | 9923647 | 5/1999 |
| WO | 2004079431 A1 | 9/2004 |
| WO | 2007002694 A2 | 1/2007 |
| WO | 2007085682 | 8/2007 |
| WO | 2007002694 A3 | 12/2007 |
| WO | 2007140273 A2 | 12/2007 |
| WO | 2008089417 A2 | 7/2008 |
| WO | 2011134169 | 11/2011 |
| WO | 2012064546 | 5/2012 |
| WO | 2012118573 | 9/2012 |
| WO | 2013112705 | 8/2013 |
| WO | 2014062912 | 4/2014 |
| WO | 2015134738 | 9/2015 |
| WO | 2015134740 | 9/2015 |
| WO | 2016033317 | 3/2016 |
| WO | 2018052590 | 3/2018 |
| WO | 2021242667 | 12/2021 |

OTHER PUBLICATIONS

International Search Report dated Jun. 18, 2010 in corresponding international application PCT/US2010/031799.

Wartenberg, Philipp, "EyeCatcher, the Bi-directional OLED Microdisplay," Proc. of SID 2011.

R.J. Jacob, "The use of eye movements in human-computer interaction techniques: what you look at is what you get", ACM Transactions on Information Systems, 9(2), 152-69, 1991.

Loschky, L.C. and Wolverton, G.S., "How late can you update gaze-contingent multiresolutional displays without detection" ACM Trans. Mult. Comp. Comm. and App. 3, Nov. 2007.

Reingold, E.M., L.C. Loschky, G.W. McConkie and D.M. Stampe, "Gaze-contingent multiresolutional displays: An integrative review," Hum. Factors 45, 307-328 (2003).

Written Opinion dated Jun. 18, 2010 in corresponding international application PCT/US2010/031799.

Geisler, W.S., U.S. Perry and J. Najemnik, "Visual search: The role of peripheral information measured using gaze-contingent displays," J. Vision 6, 858-873 (2006).

Duchowski, A.T., and A. Coltekin, "Foveated gaze-contingent displays for peripheral LOD management, 3D visualization, and stereo imaging," ACM Trans. on Mult. Comp., Comm., and App. 3, 1-21, (2007).

Akeley et al., "A Stereo Display Prototype with Multiple Focal Distances," ACM Trans. Graphics 23:804-813 (2004).

Cruz-Neira et al., 'Surround-Screen Projection-Based Virtual Reality: the Design and Implementation of the CAVE,' Proceedings of the 20th Annual Conference on Computer Graphics and Interactive Techniques pp. 135-142, ACM SIGGRAPH, ACM Press (1993).

(56) References Cited

OTHER PUBLICATIONS

Davis et al., "Accommodation to Large Disparity Stereograms," Journal of AAPOS 6:377-384 (2002).
Downing et al., "A Three-Color, Solid-State, Three-Dimensional Display," Science 273:1185-1189 (1996).
Edgar et al., "Visual Accommodation Problems with Head-Up and Helmet-Mounted Displays," Displays 15:68-75 (1994).
Favalora et al., "100 Million-Voxel Volumetric Display," Proc. SPIE 4712:300-312 (2002).
Graham-Rowe, "Liquid Lenses Make a Splash," Nature-Photonics pp. 2-4 (2006).
International Search Report dated Feb. 10, 2011 from PCT/CN2010/072376.
Heanue et al., "Volume Holographic Storage and Retrieval of Digital Data," Science 265:749-752 (1994).
Hua, "Merging the Worlds of Atoms and Bits: Augmented Virtual Environments," Optics and Photonics News 17:26-33 (2006).
Hua et al., 'Design of a Bright Polarized Head-Mounted Projection Display' Applied Optics 46:2600-2610 (2007).
Inoue et al., "Accommodative Responses to Stereoscopic Three-Dimensional Display," Applied Optics, 36:4509-4515 (1997).
Kuiper et al., "Variable-Focus Liquid Lens for Miniature Cameras," Applied Physics Letters 85:1128-1130 (2004).
Kuribayashi, et al., "A Method for Reproducing Apparent Continuous Depth in a Stereoscopic Display Using "Depth-Fused 3D" Technology" Journal of the Society for Information Display 14:493-498 (2006).
Liu et al., "An Optical See-Through head Mounted Display with Addressable Focal Planes," IEEE Computer Society, pp. 33-42 (2008).
Liu et al., "Time-Multiplexed Dual-Focal Plane Head-Mounted Display with a Liquid Lens," Optics Letters 34:1642-1644 (2009).
Liu et al., 'A Novel Prototype for an Optical See-Through Head-Mounted Display with Addressable Focus Cues,' IEEE Transactions on Visualization and Computer Graphics 16:381-393 (2010).
Liu et al., "A Systematic Method for Designing Depth-Fused Multi-Focal Plane Three-Dimensional Displays," Optics Express 18:11562-11573 (2010).
Written Opinion dated Feb. 10, 2011 from PCT/CN2010/072376.
Mcquaide et al., "A Retinal Scanning Display System That Produces Multiple Focal Planes with a Deformable Membrane Mirror," Displays 24:65-72 (2003).
Mon-Williams et al., "Binocular Vision in a Virtual World: Visual Deficits Following the Wearing of a Head-Mounted Display," Ophthalmic Physiol. Opt. 13:387-391 (1993).
"OLED-XL Microdisplays," eMagin 5 pages (2010).
Optical Research Associates, http://www.opticalres.com, 2 pages (obtained Jan. 26, 2011).
Rolland et al., "Multifocal Planes Head-Mounted Displays," Applied Optics 39:3209-3215 (2000).
Schowengerdt et al., "True 3-D Scanned Voxel Displays Using Single or Multiple Light Sources," J. Soc. Info. Display 14:135-143 (2006).
Sheedy et al., "Performance and Comfort on Near-Eye Computer Displays," Optometry and Vision Science 79:306-312 (2002).
Shibata et al., "Stereoscopic 3-D Display with Optical Correction for the Reduction of the Discrepancy Between Accommodation and Convergence," Journal of the Society for Information Display 13:665-671 (2005).
Shiwa et al., "Proposal for a 3-D Display with Accommodative Compensation: 3DDAC," Journal of the Society for Information Display 4:255-261 (1996).
Sullivan, "A Solid-State Multi-Planar Volumetric Display," SID Symposium Digest of Technical Papers 34:354-356 (2003).
Examination Report dated Apr. 29, 2011 from corresponding GB Application No. GB1012165.5.
Varioptic, "Video Auto Focus and Optical Image Stabilization," http://vwww.varioptic.com/en/home.html, 2 pages (2008).
Wann et al., Natural Problems for Stereoscopic Depth Perception in Virtual Environments, Vision Res. 35:2731-2736 (1995).
Watt et al., "Focus Cues Affect Perceived Depth," J Vision 5:834-862 (2005).
Love et al. (High Speed switchable lens enables the development of a volumetric stereoscopic display. Aug. 2009, Optics Express. vol. 17, No. 18, pp. 15716-15725.).
Hidenori Kuriyabashi, Munekazu Date, Shiro Suyama, Toyohiko HatadaJ. of the SID 14/5, 2006 pp. 493-498.
Xinda Hu and Hong Hua, "High-resolution optical see-through multi-focal-plane head-mounted display using freeform optics," Optics Express,22(11): 13896-13903, Jun. 2014.
Xin Shen, Yu-Jen Wang, Hung-Shan Chen, Xiao Xiao, Yi-Hsin Lin, and Bahram Javidi, "Extended depth-of-focus 3D micro integral imaging display using a bifocal liquid crystal lens," Optics Letters, vol. 40, issue 4, pp. 538-541 (Feb. 9, 2015).
S. Hong, J. Jang, and B. Javidi,"Three-dimensional volumetric object reconstruction using computational integral imaging," Journal of Optics Express, on-line Journal of the Optical Society of America, vol. 12, No. 3, pp. 483-491, Feb. 9, 2004.
R. Schulein, M. DaneshPanah, and B. Javidi, "3D imaging with axially distributed sensing," Journal of Optics Letters, vol. 34, Issue 13, pp. 2012-2014, Jul. 1, 2009.
S. Kishk and B. Javidi, "Improved Resolution 3D Object Sensing and Recognition using time multiplexed Computational Integral Imaging," Optics Express, on-line Journal of the Optical Society of America, vol. 11, No. 26, pp. 3528-3541, Dec. 29, 2003.
R. Schulein, C. Do, and B. Javidi, "Distortion-tolerant 3D recognition of underwater objects using neural networks," Journal of Optical Society of America A, vol. 27, No. 3, pp. 461-468, Mar. 2010.
C. Manh Do, R. Martinez-Cuenca, and B. Javidi, "Three-dimensional object-distortion-tolerant recognition for integral imaging using independent component analysis," Journal of Optical Society of America A 26, issue 2, pp. 245-251 (Feb. 1, 2009).
S. Hong and B. Javidi, "Distortion-tolerant 3D recognition of occluded objects using computational integral imaging," Journal of Optics Express, vol. 14, Issue 25, pp. 12085-12095, Dec. 11, 2006.
Christopher M. Bishop, Neural Networks for Pattern Recognition, Oxford University Press, Inc. New York, NY 1995.
'Fresnel Lenses' downloaded from http://www.fresneltech.com on Jun. 8, 2011. Copyright Fresnel Technologies, Inc., 2003.
M. Daneshpanah, B. Javidi, and E. Watson, "Three dimensional integral imaging with randomly distributed sensors," Journal of Optics Express, vol. 16, Issue 9, pp. 6368-6377, Apr. 21, 2008.
Yano, S., Emoto, M., Mitsuhashi, T., and Thwaites, H., "A study of visual fatigue and visual comfort for 3D HDTV/HDTV images," Displays, 23(4), pp. 191-201, 2002.
D.M. Hoffman, A.R. Girshick, K. Akeley, and M.S. Banks, "Vergence-Accommodation Conflicts Hinder Visual Performance and Cause Visual Fatigue," J. Vision, 8(3), 1-30, (2008).
C. B. Burckhardt, "Optimum parameters and resolution limitation of integral photography," J. Opt. Soc. Am. 58, 71-76 (1968).
T. Okoshi, "Optimum design and depth resolution of lens-sheet and projection-type three-dimensional displays," Appl. Opt. 10, 2284-2291 (1971).
F. Okano, H. Hoshino, J. Arai y I. Yuyama, "Real-time pickup method for a three-dimensional image based on integral photography," Appl. Opt. 36, 1598-1603 (1997).
Zhang, R., "8.3: Design of a Compact Light Engine for FLCOS Microdisplays in a p-HMPD system", Society for Information Display 2008 International Symposium, Seminar and Exhibition (SID2008), Los Angeles, CA, May 2008.
J. Arai, et al., "Depth-control method for integral imaging," Feb. 1, 2008 / vol. 33, No. 3 / Optics Letters.
H. Hua, "Sunglass-like displays become a reality with freeform optical technology," SPIE Newsroom, 2012.
H. Hua, X. Hu, and C. Gao, "A high-resolution optical see-through head-mounted display with eyetracking capability," Optics Express, Nov. 2013.
D. Cheng, Y.Wang, H. Hua, and M. M. Talha, Design of an optical see-through headmounted display with a low f-number and large field of view using a free-form prism, App. Opt. 48 (14), pp. 2655-2668, 2009.

(56) References Cited

OTHER PUBLICATIONS

A. Jones, I. McDowall, Yamada H., M. Bolas, P. Debevec, Rendering for an Interactive 360° Light Field Display ACM Transactions on Graphics (TOG)—Proceedings of ACM SIGGRAPH 2007, 26(3), 2007.
Tibor Balogh, "The HoloVizio System," Proceedings of SPIE, Voi 6055, 2006.
Y. Takaki, Y. Urano, S. Kashiwada, H. Ando, and K. Nakamura, "Super multi-view winshield display for long-distance image information presentation," Opt. Express, 19, 704-16, 2011.
Winterbottom, M., et al., 'Helmet-Mounted Displays for use in Air Force Training and Simulation', Human Effectiveness Directorate, Nov. 2005, pp. 1-54.
Schowengerdt, B. T., and Seibel, E. J., "True 3-D scanned voxel displays using single or multiple light sources," Journal of SID, 14(2), pp. 135-143, 2006.
X. Hu and H. Hua, "Design and assessment of a depth-fused multi-focal-plane display prototype," Journal of Display Technology, Dec. 2013.
Suyama, S., Ohtsuka, S., Takada, H., Uehira, K., and Sakai, S., "Apparent 3D image perceived from luminance-modulated two 2D images displayed at different depths," Vision Research, 44: 785-793, 2004.
J. Hong, S. Min, and B. Lee, "Integral floating display systems for augmented reality," Applixed Optics, 51(18):4201-9, 2012.
A. Malmone, and H. Fuchs, "Computational augmented reality eyeglasses," Proc. of ISMAR 2012.
H. Mukawa, K. Akutsu, I. Matsumura, S. Nakano, T. Yoshida, M. Kuwahara, and K. Aiki, A full-color eyewear display using planar waveguides with reflection volume holograms, J. Soc. Inf. Display 19 (3), pp. 185-193, 2009.
Cakmakci, O., et al., 'Head-Worn Displays: A Review'. Journal of Display Technology, vol. 2, No. 3, Sep. 2006, pp. 199-216.
M. Marti-nez-Corral, H. Navarro, R. Marti-nez-Cuenca, G. Saavedra, and B. Javidi, "Full parallax 3-D Tv with programmable display parameters," Opt. Phot. News 22, 50-50 (2011).
J. S. Jang and B. Javidi, "Large depth-of-focus time-multiplexed three-dimensional integral imaging by use of lenslets with non-uniform focal lengths and aperture sizes," Opt. Lett. vol. 28, pp. 1924-1926 (2003).
Chih-Wei Chen, Myungjin Cho, Yi-Pai Huang, and Bahram Javidi, "Improved viewing zones for projection type integral imaging 3D display using adaptive liquid crystal prism array," IEEE Journal of Display Technology, 2014.
Xiao Xiao, Bahram Javidi, Manuel Martinez-Corral, and Adrian Stern, "Advances in Three-Dimensional Integral Imaging: Sensing, Display, and Applications," Applied Optics, 52(4):. 546-560,2013.
J. S. Jang, F. Jin, and B. Javidi, "Three-dimensional integral imaging with large depth of focus by use of real and virtual image fields," Opt. Lett. 28:1421-23, 2003.
S. Bagheri and B. Javidi, "Extension of Depth of Field Using Amplitude and Phase Modulation of the Pupil Function," Journal of Optics Letters, vol. 33, No. 7, pp. 757-759, Apr. 1, 2008.
M. Lucente, "Interactive three-dimensional holographic displays: seeing the future in depth," Computer Graphics, 31(2), pp. 63-67, 1997.
P. A. Blanche, et al, "Holographic three-dimensional telepresence using large-area photorefractive polymer", Nature, 468, 80-83, Nov. 2010.
G. Wetzstein et al., "Tensor Displays: Compressive light field synthesis using multilayer displays with directional backlighting," ACM Transactions on Graphics, 31(4), 2012.
Blundell, B. G., and Schwarz, A. J., "The classification of volumetric display systems: characteristics and predictability of the image space," IEEE Transaction on Visualization and Computer Graphics, 8(1), pp. 66-75, 2002.
Jisoo Hong, et al., "Three-dimensional display technologies of recent interest: Principles, Status, and Issues," Applied Optics (Dec. 1, 2011) 50(34):106.

J. Y. Son, W.H. Son, S.K. Kim, K.H. Lee, B. Javidi, "Three-Dimensional Imaging for Creating Real-World-Like Environments," Proceedings of IEEE Journal, vol. 101, issue 1, pp. 190-205, Jan. 2013.
R. R.Martinez-Cuenca et al, H. Navarro, G. Saavedra, B. Javidi, and M. Martinez-Corral, "Enhanced viewing-angle integral imaging by multiple-axis telecentric relay system," Optics Express, vol. 15, Issue 24, pp. 16255-16260, Nov. 21, 2007.
A. Castro, Y. Frauel, and B. Javidi, "Integral imaging with large depth of field using an asymmetric phase mask," Journal of Optics Express, vol. 15, Issue 16, pp. 10266-10273 (Aug. 2007).
International Search Report dated Jan. 29, 2014 in corresponding international application PCT/US2013/065422.
GB Examination Report corresponding to GB 1012165.5 dated Jun. 28, 2011.
European Search Report dated Aug. 14, 2015 in corresponding EP application 13740989.2.
International Search Report and Written Opinion dated Nov. 24, 2015 in corresponding PCT application PCT/US2015/047163.
International Search Report dated Mar. 9, 2009 with regard to International Patent Application No. PCT/ US2009/031606.
Xin et al., "Design of Secondary Optics for IRED in active night vision systems," Jan. 10, 2013, vol. 21, No. 1, Optics Express, pp. 1113-1120.
S. Nikzad, Q. Yu, A. L. Smith, T. J. Jones, T. A. Tombrello, S. T. Elliott, "Direct detection and imaging of low-energy electrons with delta-doped charge-coupled devices," Applied Physics Letters, vol. 73, p. 3417, 1998.
Written Opinion of the International Searching Authority dated Mar. 9, 2009 with regard to International Patent Application No. PCT/ US2009/031606.
European Search Report dated Apr. 28, 2016 from EP application 13847218.8.
Xinda Hu et al: "48.1: Distinguished Student Paper: A Depth-Fused Multi-Focal-Plane Display Prototype Enabling Focus Cues in StereoscopicDisplays", SID International Symposium. Digest of Technical Papers, vol. 42, No. I, Jun. 1, 2011 (Jun. 1, 2011), pp. 691-694, XP055266326.
Hu and Hua, "Design and tolerance of a freeform optical system for an optical see-through multi-focal plane display," Applied Optics, 2015.
A. Yabe, "Representation of freeform surface suitable for optimization," Applied Optics, 2012.
Krueerke, Daniel, "Speed May Give Ferroelectric LCOS Edge in Projection Race," Display Devices Fall '05. Copyright 2005 Dempa Publications, Inc. pp. 29-31.
J. P. Rolland and Hong Hua. "Head-mounted display systems," in Encyclopedia of Optical Engineering. R. Barry Johnson and Ronald O. Driggers, Eds, (2005).
Zhang, R., et al., "Design of a Polarized Head-Mounted Projection Display using FLCOS Microdisplays", Proc. of SPIE vol. 6489, 64890B-1. (2007).
Azuma, R., et al., 'Recent advances in augmented reality', IEEE Computer Graphics App;. 21, 34-47 (2001).
Bajura, M., et al., "Merging virtual objects with the real world: seeing ultrasound imagery within the patient" in Proceedings of ACM SIGGRAPH (ACM, Chicago, 1992), pp. 203-210.
Caudell, T., et al., "Augmented reality: an application of heads-up display technology to manual manufacturing processes" in Proceedings of Hawaii International Conferences on Systems Sciences (Hawaii, 1992), pp. 659-669.
Rolland, J.P., et al., 'Optical versus video see-through head mounted displays in medical visualization', Presence' Teleoperators and Virtual Environments 9, 287-309 (2000).
H. Hua., A. Girardot, C. Gao. J. P. Rolland. 'Engineering of head-mounted projective displays'. Applied Optics. 39 (22), pp. 3814-3824. (2000).
R. N. Berry, L. A. Riggs, and C. P. Duncan, "The relation of vernier and depth discriminations to field brightness," J. Exp. Psychol. 40, 349-354 (1950).
Biocca, et al., "Virtual eyes can rearrange your body: adapting to visual displacement in see-through, head-mounted displays", Presence: Teleoperators and Virtual Environments 7, 262-277 (1998).

(56) References Cited

OTHER PUBLICATIONS

R. Kijima and T. Ojika, "Transition between virtual environment and workstation environment with projective headmounted display," in Proceedings of IEEE VR 1997 (IEEE, 1997), pp. 130-137.
H. Hua, C. Gao, and J. P. Rolland, 'Study of the Imaging properties of retroreflective materials used in head-mounted projective displays (HMPDs),' Proc. SPIE4711, 194-201 (2002).
H. Hua and C. Gao, "A polarized head-mounted projective display," in Proceedings of IEEE and ACM International Symposium on Mixed and Augmented Reality 2005 (IEEE, 2005), pp. 32-35.
Bunkenburg, J. 'Innovative Diffractive Eyepiece for Helmet-Mounted Display.' SPIE vol. 3430. pp. 41-49 Jul. 1998.
N. Kawakami, M. Inami, D. Sekiguchi, Y. Yangagida, T. Maeda, and S. Tachi, 'Object-oriented displays: a new type of display systemsfrom immersive display to object-oriented displays,' in Proceedings of IEEE SMC 1999, IEEE International Conference on Systems, Man, and Cybernetics, vol. 5, pp. 1066-1069.
J. E. Melzer's: 'Overcoming the field-of-view/resolution invariant in head-mounted displays' Proc. SPIE vol. 3362, 1998, p. 284.
M. Inami, N. Kawakami, D. Sekiguchi, Y. Yanagida, T. Maeda, and S. Tachi, "Visuo-haptic display using head-mounted projector," in Proceedings of IEEE Virtual Reality 2000, pp. 233-240.
H. Hua, Y. Ha, and J. P. Rolland, 'Design of an ultra-light and compact projection lens,' Appl. Opt. 42, 1-12 (2003), pp. 97-107.
H. Hua, C. Gao, F. Biocca, and J. P. Rolland, "An ultra-light and compact design and implementation of head-mounted projective displays," in Proceedings of IEEE VR 2001, pp. 175-182.
Y. Ha, H. Hua, R. Martins, and J. P. Rolland, "Design of a wearable wide-angle projection color display," in Proceedings of International Optical Design Conference 2002 (IODC, 2002), pp. 67-73.
J. P. Rolland, F. Biocca, F. Hamza-Lup, Y. Ha, and R. Martins, "Development of head-mounted projection displays for distributed, collaborative, augmented reality applications," Presence: Teleoperators and Virtual Environments 14, 528-549 (2005).
J. L. Pezzaniti and R. A. Chipman, "Angular dependence of polarizing beam-splitter cubes," Appl. Opt. 33, 1916-1929 (1994).
R. Azuma, A Survey of Augmented Reality in Presence; Teleoperators and Virtual Environments 6. 4, 355-385, (1997).
R. Martins, V. Shaoulov, Y. Ha, and J. P. Rolland, "Projection based head-mounted displays for wearable computers," Proc. SPIE 5442, 104-110 (2004).
C. Curatu, H. Hua, and J. P. Rolland, "Projection-based headmounted display with eye-tracking capabilities," Proc. SPIE 5875, 587050J (2005).
R. Kijima, K. Haza, Y. Tada, and T. Ojika, "Distributed display approach using PHMD with infrared camera," in Proceedings of IEEE 2002 Virtual Reality Annual International Symposium (IEEE, 2002), pp. 1-8.
L. G. Brown's: 'Applications of the Sensics panoramic Hmd' SID Symposium Digest vol. 39, 2008, p. 77.
M. Inami, N. Kawakami, and S. Tachi, 'Optical camouflage using retro-reflective projection technology,' in Proceedings of ISMAR 2003 {ISMAR, 2003).
L. Davis, J. P. Rolland, F. Hamza-Lup, Y. Ha, J. Norfleet, and C. Imielinska, 'Enabling a continuum of virtual environment experiences,' IEEE Comput. Graphics Appl. 23, pp. 10-12 Mar./Apr. 2003.
H. Hua, L. Brown, and C. Gao, "A new collaborative infrastructure: SCAPE," in Proceedings of IEEE VR 2003 (IEEE, 2003), pp. 171-179.
H. Hua, L. Brown, and C. Gao, "SCAPE: supporting stereoscopic collaboration in augmented and projective environments," IEEE Comput. Graphics Appl. 24, 66-75 (2004).
H. Hua, L. Brown, and C. Gao, "System and interface framework for SCAPE as a collaborative infrastructure," Presence: Teleoperators and Virtual Environments 13, 234-250 (2004).
L. Brown and H. Hua, "Magic lenses for augmented virtual environments," IEEE Comput. Graphics Appl. 26, 64-73 (2006).
M. Gutin: 'Automated design and fabrication of ocular optics' Proc. SPIE 2008, p. 7060.

M. Robinson. J. Chen, and G. Sharp, Polarization Engineering for LCD Projection. John Wiley & Sons, Ltd. England, 2005.
Zhang, R., et al., "Design of a Polarized Head-Mounted Projection Display Using Ferroelectric Liquid-Crystal-on-Silicon Microdisplays", Applied Optics, vol. 47, No. 15, May 20, 2008, pp. 2888-2896.
D. Cheng, Y. Wang, H. Hua, and M. M. Talha, "Design of an optical see-through head-mounted display with a low f-number and large field of view using a freeform prism," Appl. Opt., 48(14):2655-2668, 2009.
D. Cheng, Y. Wang, H. Hua, J. Sasian, "Design of a wide-angle, lightweight head-mounted display using free-form optics tiling," Opt. Lett., 36(11):2098-100, 2011.
P. Gabbur, H. Hua, and K. Barnard, 'A fast connected components labeling algorithm for real-time pupil detection,' Mach. Vision Appl., 21(5):779-787, 2010.
H. Hua, P. Krishnaswamy, and J.P. Rolland, 'Video-based eyetracking methods and algorithms in head-mounted displays,' Opt. Express, 14(10):4328-50, May 2006.
H. Hua, C. Pansing, and J.P. Rolland, "Modeling of an eye-imaging system for optimizing illumination schemes in an eye-tracked head-mounted display," Appl. Opt., 46(31):7757-75, Oct. 2007.
Yamazaki et al, "Thin wide-field-of-view HMD with free-form-surface prism and applications", Proc. SPIE 3639, Stereoscopic Displays and Virtual Reality Systems VI, 453 (May 24, 1999).
T. Ando, K. Yamasaki, M. Okamoto, and E. Shimizu, "Head Mounted Display using holographic optical element," Proc. SPIE, vol. 3293, 183 (1998).
O. Cakmakci, B. Moore, H. Foroosh, and J. P. Rolland, "Optimal local shape description for rotationally non-symmetric optical surface design and analysis," Opt. Express 16, 1583-1589 (2008).
Curatu, C., J.P. Rolland, and Hong Hua, "Dual purpose lens for an eye-tracked projection head-mounted display," Proceedings of International Optical Design Conference, Vancouver, Canada, Jun. 2006.
J. G. Droessler, D. J. Rotier, "Tilted cat helmet-mounted display," Opt. Eng., vol. 29, 849 (1990).
A. T. Duchowski, "Incorporating the viewer's Point-Of-Regard (POR) in gaze-contingent virtual environments", SPIE-Int. Soc. Opt. Eng. Proceedings of Spie—the International Society for Optical Engineering, vol. 3295, 1998, pp. 332-343.
Duchowski, A., "Eyetracking Methodology: theory and practice," Publisher: Springer, 2003.
H. Hoshi, N. Taniguchi, H. Morishima, T. Akiyama, S. Yamazaki and A. Okuyama, "Off-axial HMD optical system consisting of aspherical surfaces without rotational symmetry," SPIE vol. 2653, 234 (1996).
Hua, H., C. Pansing, and J. P. Rolland, "Modeling of an eye-imaging system for optimizing illumination schemes in an eye-tracked head-mounted display," Applied Optics, 46(32): 1-14, Nov. 2007.
K. Iwamoto, S. Katsumata, K. Tanie, "An eye movement tracking type head mounted display for virtual reality system:—evaluation experiments of a prototype system", Proceedings of 1994 IEEE International Conference on Systems, Man, and Cybernetics. Humans, Information and Technology (Cat. No.94CH3571-5). IEEE. Part vol. 1, 1994, pp. 13-18 vol. 1. New York, NY, USA.
K. Iwamoto, K. Tanie, T. T. Maeda, "A head-mounted eye movement tracking display and its image display method", Systems & Computers in Japan, vol. 28, No. 7, Jun. 30, 1997, pp. 89-99. Publisher: Scripta Technica, USA.
Hua et al., "Compact eyetracked optical see-through head-mounted display", Proc. SPIE 8288, Stereoscopic Displays and Applications XXIII, 82881F (Feb. 9, 2012).
M. D. Missig and G. M. Morris, "Diffractive optics applied to eyepiece design," Appl. Opt. 34, 2452-2461 (1995).
J. P. Rolland, "Wide-angle, off-axis, see-through head-mounted display," Opt. Eng., vol. 39, 1760 (2000).
M. L. Thomas, W. P. Siegmund, S. E. Antos, and R. M. Robinson, "Fiber optic development for use on the fiber optic helmet-mounted display", Helmet-Mounted Displays, J. T. Carollo, ed., Proc. SPIE 116, 90-101, 1989.
Laurence R. Young, David Sheena, "Survey of eye movement recording methods", Behavior Research Methods & Instrumentation, 7(5), 397-429, 1975.

(56) References Cited

OTHER PUBLICATIONS

Rolland, J. P., A. Yoshida, L. D. Davis and J. H. Reif, "High-resolution inset head-mounted display," Appl. Opt. 37, 4183-93 (1998).

Hua, H. "Integration of eye tracking capability into optical see-through head-mounted displays," Proceedings of SPIE (Electronic Imaging 2001), pp. 496-503, Jan. 2001.

Hoshi, et al, "Off-axial HMD optical system consisting of aspherical surfaces without rotational symmetry," Proc. SPIE 2653, Stereoscopic Displays and Virtual Reality Systems III, 234 (Apr. 10, 1996).

S. Feiner, 2002, "Augmented reality: A new way of seeing," Scientific American, No. 54, 2002.

K. Ukai and P.A. Howardth, "Visual fatigue caused by viewing stereoscopic motion images: background, theories, and observations," Displays, 29(2), pp. 106-116, 2008.

X. Hu and H. Hua, "Design and tolerance of a free-form optical system for an optical see-hrough multi-focal-plane display," Applied Optics, 54(33): 9990-9, 2015.

H. Hua and B. Javidi, "A 3D integral imaging optical see-through head-mounted display", Optics Express, 22(11): 13484-13491, 2014.

W. Song, Y. Wang. D. Cheng, Y. Liu, "Light field head-mounted display with correct focus cue using micro structure array," Chinese Optics Letters, 12(6): 060010, 2014.

B. T. Schowengerdt, M. Murari, E. J. Seibel, "Volumetric display using scanned fiber array," SID Symposium Digest of Technical Papers, 2010.

Hu, X., Development of the Depth-Fused Multi-Focal Plane Display Technology, Ph.D. Dissertation, College of Optical Sciences, University of Arizona, 2014.

S. Ravikumar, K. Akeley, and M. S. Banks, "Creating effective focus cues in multi-plane 3D displays," Opt. Express 19, 20940-20952, 2011.

T. Peterka, R. Kooima, D. Sandin, A. Johnson, J. Leigh, T. DeFanti, "Advances in the Dynallax solid-state dynamic parallax barrier autostereoscopi visualization display system," IEEE Trans. Visua. Comp. Graphics, 14(3): 487-499, 2008.

Dewen Cheng et al.; "Large field-of-view and high resolution free-form head-mounted display"; SPIE-OSA/ vol. 7652 Jun. 2018.

G. Lippmann, "Epreuves reversibles donnant la sensation du relief," Journal of Physics (Paris) 7, 821-825 (1908).

Huang et al., "An integral-imaging-based head-mounted light field display using a tunable lens ,;1nd aperture array." Journal of the Society for Information Display Mar. 1, 2017; p. 199-201.

Full Certified Translation of Reference JP 02200074.

Full Certified Translation of Reference JP008160345.

Cheol-Joong Kim et al, "Depth plane adaptive integral imaging using a varifocal liquid lens array", Applied Optics, OSA, vol. 54, No. 10, Apr. 1, 2015 (Apr. 1, 2015), pp. 2565-2571.

Xin Shen et al: "Large depth of focus dynamic micro integral imaging for optical see-through augmented reality display using a focus-tunable lens", Applied Optics, vol. 57, No. 7, Mar. 1, 2018 (Mar. 1, 2018), p. B184.

Martinez-Cuenca R et al: "Progress in 3-D Multiperspective Display by Integral Imaging", Proceedings of the IEEE, IEEE. New York, US, vol. 97, No. 6, Jun. 1, 2009 (Jun. 1, 2009), pp. 1067-1077.

Kim Cheoljoong et al: "Depth-enhanced integral imaging display system with time-multiplexed depth planes using a varifocal liquid lens array", Proceedings of SPIE, IEEE, US, vol. 9385, Mar. 11, 2015 (Mar. 11, 2015), pp. 93850D-93850D.

Huan Deng et al: "The Realization of Computer Generated Integral Imaging Based on Two Step Pickup Method", Photonics and Optoelectronic (Sopo), 2010 Symposium on, IEEE, Piscataway, NJ, USA, Jun. 19, 2010 (Jun. 19, 2010), pp. 1-3.

H. Hua, "Enabling focus cues in head-mounted displays," Proceedings of the IEEE 105(5), 805-824 (2017).

G. E. Favalora, "Volumetric 3D displays and application infrastructure," Computer, 38(8), 37-44 (2005).

H. Yu, K. Lee, J. Park, and Y. Park, "Ultrahigh-definition dynamic 3D holographic display by active control of volume speckle fields," Nature Photonics 11(3), 186 (2017).

G. Li, D. Lee, Y. Jeong, J. Cho, and B. Lee, "Holographic display for see-through augmented reality using mirror-lens holographic optical element," Opt. Letters 41(11), 2486-2489 (2016).

S. B. Kim and J. H. Park, "Optical see-through Maxwellian near-to-eye display with an enlarged eyebox," Opt. Letters 43(4), 767-770 (2018).

D. Lanman and D. Luebke, "Near-eye light field displays," ACM Trans. Graph. 32(6), 1-10 (2013).

H. Huang and H. Hua, "High-performance integral-imaging-based light field augmented reality display using freeform optics," Opt. Express 26(13), 17578-17590 (2018).

B. Liu, X. Sang, X. Yu, X. Gao, L. Liu, C. Gao, P. Wang, Y. Le, and J. Du, "Time-multiplexed light field display with 120-degree wide viewing angle". Opt. Express 27(24), pp. 35728-35739 (2019).

H. Huang and H. Hua, "Generalized methods and strategies for modeling and optimizing the optics of 3D head-mounted light field displays," Opt. Express 27(18), 25154-25171 (2019).

H. Huang and H. Hua, "Systematic characterization and optimization of 3D light field displays," Opt. Express 25(16), 18508-18525 (2017).

J. H. Park, S. W. Min, S. Jung, and B. Lee. "Analysis of viewing parameters for two display methods based on integral photography." Applied Optics 40, No. 29 5217-5232 (2001).

X. Wang, Y. Qin, H. Hua, Y. H. Lee, and S. T. Wu. "Digitally switchable multi-focal lens using freeform optics." Opt. Express 16;26(8):11007-17(2018).

X. Wang, and H. Hua. "Digitally Switchable Micro Lens Array for Integral Imaging." SID Symposium Digest of Technical Papers. vol. 51. No. 1. (2020).

M. Xu and H. Hua, "Finite-depth and varifocal head-mounted display based on geometrical lightguide," Opt. Express 28(8), 12121-12137 (2020).

Jason Geng: "Three-dimensional display technologies", Advances in Optics and Photonics, vol. 5, No. 4, Nov. 22, 2013 (Nov. 22, 2013), pp. 456-535.

F.Z. Fang, X. D. Zhang, A. Weckenmann, G.X. Zhang, C. Evans, Manufacturing and measurement of free form optics, CI RP Annals, vol. 62, Issue 2, 2013, pp. 823-846, ISSN 0007-8506, https://doi.org/10.1016/j.cirp.2013.05.003. (https://www.sciencedirect.com/science/article/pii/S0007850613001935) (Year: 2013).

\* cited by examiner

WIDE ANGLE AND HIGH RESOLUTION TILED HEAD-MOUNTED DISPLAY DEVICE

RELATED APPLICATIONS

This application is a continuation of U.S. application Ser. No. 17/065,788 filed Oct. 8, 2020, which in turn is a continuation of U.S. application Ser. No. 16/366,204 filed Mar. 27, 2019, which in turn is a continuation of U.S. application Ser. No. 14/953,563 filed Nov. 30, 2015, which in turn is a continuation of U.S. application Ser. No. 13/695,069 filed Apr. 2, 2013, now U.S. Pat. No. 9,244,277, which in turn is a 371 application of International Application No. PCT/CN2010/072376 filed Apr. 30, 2010, the entire contents of which applications are incorporated herein by reference.

STATEMENT OF GOVERNMENT INTEREST

This invention was made with government support under Grant No. 0644446 awarded by NSF. The government has certain rights in the invention.

BACKGROUND OF THE INVENTION

This invention was partially funded by National Natural Science Foundation of China grant nos. 61205024 and 61178038, and Hi-Tech Research and Development Program of China grant no. 2009AA01Z308.

The present invention relates to a head-mounted display device, and in particular, to a tiled head-mounted display device comprising wedge-shaped prisms with free-form surfaces.

Head-mounted display devices for virtual environment and augmented environment are popular products in display industry and have been extensively developed in recent years. Head-mounted display device can be used in consumer applications such as 3D movie, video game and sports as well as high end applications such as scientific research, medical/industry training, flight simulation, immersed entertainments. To be a useful and valid display system, the head-mounted display must be capable of generating high fidelity and wide field of view scene. The compactness and lightweight are also preferred to reduce user's neck fatigue.

A head-mounted display device typically consists of three parts: display component, optical system and helmet. In order to reduce the weight of the head-mounted display device, it is crucial to use an optical system with a short focal length and a micro-display. However, there is a trade-off between compactness of optical system and imaging quality of head-mounted display. For head-mounted display device, it is necessary for the optical system to have a large field of view and large exit pupil diameter. The large field of view increases the sense of immersion and allows the users to observe mobile object better. The large exit pupil diameter allows the users to arbitrarily move their eyes during observation without image lost. It would also allow various users with different interpupillary distance to use the system without adjusting the interpupillary distance of the helmet. However, it is difficult to achieve wide field of view, large exit pupil diameter and high resolution at the same time, due to the tradeoff relationships among these parameters.

For a conventional head-mounted display system employing a single display channel with a single micro-display for each eye, the relationship between the field of view and the resolution may satisfy R=N/FOV, where R is resolution of the display system, N is resolution of the single micro-display, and FOV is a field of view of the display system. R and FOV are mutually restricted by each other with a given N value, that is, a large field of view will result in a low resolution. Therefore it is difficult to satisfy the requirements of large field of view and high resolution simultaneously in a conventional head-mounted display device employing a single display channel.

A tiled head-mounted optical display system based on conventional rotational symmetry oculars is proposed in J. E. Melzer's paper titled "Overcoming the field-of-view/resolution invariant in head-mounted displays", Proc. SPIE, Vol. 3362, 284 (1998), L. G. Brown's paper titled "Applications of the Sensics panoramic HMD", SID Symposium Digest 39, 77 (2008), and M. Gutin' paper titled "Automated design and fabrication of ocular optics", Proc. SPIE 7060, (2008). FIG. 1a shows a schematic view of a tiled optical system and a schematic view showing distortion correction of each display channel of the system. FIG. 1b shows a schematic view of image shown on a screen observed through the system formed by tiling two oculars with rotational symmetry when the micro-displays in the system display an image of regular rectangles.

As shown in FIG. 1a, the tiled head-mounted optical display system based on the conventional rotational symmetry oculars requires a great number of oculars tiled together in order to obtain a satisfied field of view. The rotational deviation of the respective display channels and the corresponding micro-displays from the user's viewing axis leads to tilting in the image planes of display channels. In this case, image magnification varies throughout the tiled system, resulting in image distortion on the pupil plane for the displays located at the edges. As shown in FIG. 1b, a regular rectangle image displayed by micro-displays is observed as a trapezoid through the rotational tiled oculars. Therefore, the images to be displayed on each display of the tiled optical system needs to be pre-warped, otherwise the user will observe distorted images. For example, the warping for the regular rectangle image is shown in the right portion of FIG. 1a. The image displayed on central displays is unchanged and is still a regular rectangle, while the image displayed on marginal displays needs to be pre-warped to be as a trapezoid.

In addition, in tiling process, the oculars at the edges need to be rotated around the center of the exit pupil of the system, therefore, the eye clearance, that is, the minimum distance from human eyes to the tiled oculars is reduced. As shown in FIG. 1a, the eye clearance (ec') of the optical tiled system is less than the eye clearance (ec) of an ocular with a single display channel. Therefore, in order to satisfy the overall requirements of the eye clearance, so that such system can also be used by the users who wear for example glasses or mask, the exit pupil distance or eye clearance of a single ocular must be increased. Moreover, the exit pupil planes of the respective oculars do not coincide with each other but are tilted relative to each other. Therefore, users may see discontinuous images when their eyeballs are moving. The decrease of the effective exit pupil diameter may also lead to pupil aberration. In addition, in the system shown in FIG. 1a, the ocular with rotational symmetry is located between the user's eyes and the micro-displays. If the head-mounted display device is used for augmented environment, a transmissive-reflective optical component needs to be added in order to satisfy the requirements of optical transmission and reflection. In that case, the ocular size will be further increased in order to ensure minimum eye clearance (from half mirror to user's eyes). For a system tiled by a plurality of oculars, the structure of optical system is greatly complicated, and the weight and size of optical systems are increased significantly.

Moreover, the tiling process of the oculars with rotational symmetry is complex, requiring additional processes for the tiling surfaces. For this tiled system, positions and angles of the tiled surfaces of each ocular are different depending on the positions of the oculars in the tiled system. For the ocular at the center, it is necessary to process three or four tilted tiling surface. The processing requirements for oculars at different position are also different. Therefore, it is very difficult to process and assemble this tiled system with relatively high precision.

Therefore, there is a demand for a new kind of head-mounted display device having a large field of view and a high-resolution.

BRIEF SUMMARY OF THE INVENTION

In one aspect of the invention, there is provided a tiled head-mounted display device comprising: an optical component including a plurality of prisms with free-form surfaces, each prism being a wedge prism comprising a first optical surface, a second optical surface and a third optical surface; and a display component including a plurality of micro-displays. The number of the micro-displays and the number of the prisms with free-form surfaces is identical. Each prism with free-form surfaces and the corresponding micro-display constitutes a display channel.

A coordinate system for the tiled head-mounted display device is defined as: global coordinate origin O is the exit pupil center (eye pupil); Z-axis is in a direction along the viewing axis of the user's eye; Y-axis is perpendicular to Z-axis and extends right above the eye; X-axis is perpendicular to both Y-axis and Z-axis, constituting a Cartesian coordinate.

The display channels are tiled in a mosaic pattern, similar to a video wall so that the overall display field of view of the tiled device is equivalent to tiles from individual display channels abutted together. The center of exit pupil of each display channel in the tiled device is located at a common point, i.e. center of the eye pupil.

The prism can comprise a first optical surface, a second optical surface and a third optical surface in a counter-clockwise order relative to X-axis. The first optical surface and the second optical surface are free-form surfaces, the third optical surface can be selected from free-form, spherical or aspherical surface. The first optical surface is a transmissive surface, the second optical surface is a concave reflective surface or semi-transmissive and semi-reflective surface, and the third optical surface is a transmissive surface.

The free-form surface equation of the first optical surface, the second optical surface and the third optical surface may follow (but are not limited to) any one of conditions (1) to (4), $$z = \frac{c_x x^2 + c_y y^2}{1 + \{1 - (1+k_x)c_x^2 x^2 - (1+k_y)c_y^2 y^2\}^{1/2}} + \sum_{i=1}^{n} A_i \{(1-P_i)x^2 + (1+P_i)y^2\}^{i+1} \quad (1)$$

where z is the sag of the free-form surface measured along the z-axis of a local x, y, z coordinate system, $c_x$ is radius of curvature in the x direction in the xz-plane, $c_y$ is radius of curvature in the y direction in the yz-plane, $k_x$ is conic coefficient in x direction, $k_y$ is conic coefficient in y direction, $A_i$ are aspherical coefficients of 4, 6, 8, 10, ... 2n orders, $P_i$ are non-rotational symmetry coefficient of 4, 6, 8, 10, ... 2n orders, and the surface has rotational symmetry about z-axis.

$$z = \frac{c(x^2 + y^2)}{1 + sqrt(1 - (1+k)c^2(x^2+y^2))} + \sum_{j=2}^{66} C_j x^m y^n, \quad (2)$$

$$j = [(m+n)^2 + m + 3n]/2 + 1$$

where z is the sag of the free-form surface measured along the z-axis of a local x, y, z coordinate system, c is radius of curvature of surface, $C_j$ is polynomial coefficients, k is conic coefficient, m is an even number;

$$z = \frac{c(x^2 + y^2)}{1 + sqrt(1 - (1+k)c^2(x^2+y^2))} + \sum_{j=1}^{66} C_{j+1} Z_j \quad (3)$$

where z is the sag of the free-form surface measured along the z-axis of a local x, y, z coordinate system, c is radius of curvature of surface, k is conic coefficient, $Z_j$ is Zernike polynomial, $C_{j+1}$ is coefficients for $Z_j$;

$$z = \frac{c_x x^2 + c_y y^2}{1 + sqrt(1 - (1+k_x)c_x x^2 - (1+k_y)c_y y^2)} + \sum_{j=1}^{37} C_j x^{2m} y^n \quad (4)$$

$$2m + n \leq 10, m = 0, 1, 2, 3, 4, 5, n = 0, 1, \ldots, 10$$

where z is the sag of the free-form surface measured along the z-axis of a local x, y, z coordinate system, c is the vertex curvature, k is the conic constant, $c_x$ is radius of curvature of surface in sagittal direction, $c_y$ is radius of curvature of surface in tangential direction, and $C_j$ is the coefficient for $x^{2m} y^n$.

$$z = \frac{cx^2}{1 + [1 - (1+k)c^2 x^2]^{1/2}} + Ax^4 + Bx^6 + Cx^8 + Dx^{10} \quad (5)$$

where z is the sag of the free-form surface measured along the z-axis of a local x, y, z coordinate system, c is radius of curvature, k is conic coefficient, A, B, C, D are aspheric coefficients of 4, 6, 8 and 10 orders, respectively.

According to one embodiment of the present invention, the display channels can be tiled by mechanical tiling methods, the first optical surface, the second optical surface and the third optical surface of each prism satisfy following conditions (6)-(8):

$$\begin{cases} 0.5 \leq Z_{Pa'} - Z_{Pa} \leq 4 \\ Y_{Pa'} - Y_{Pa} \leq 0 \\ Y_{Pa''} - Y_{Pa} \geq 0 \end{cases} \quad (6)$$

$$\begin{cases} Y_{Pb'} - Y_{Pb} \geq 0 \\ -3 \leq Z_{Pb'} - Z_{Pb} \leq 0 \end{cases} \quad (7)$$

$$\begin{cases} -4 \leq Y_{Pc} - Y_{Pc'} \leq 0 \\ 0 \leq Z_{Pc} - Z_{Pc'} \leq 2 \end{cases} \quad (8)$$

where $R_u$ is the top marginal ray of the maximum field of view in positive Y direction, $R_b$ is the light ray at lower boundary of the maximum field of view in negative Y direction; $P_a$ is an intersection point at which $R_b$ is transmitted through the first optical surface, $P_a'$ is an intersection point of $R_b$ with the second optical surface and Pa" is an intersection point of $R_b$ with the first optical surface upon total reflection; $P_b$ is an intersection point of $R_u$ with the second optical surface (3), $P_b'$ is an intersection point of $R_b$ with the third optical surface; $P_c$ is an intersection point at which $R_u$ is reflected on the first optical surface, $P_c'$ is an intersection point of $R_u$ with the third optical surface, Y, Z are coordinates of each point in global coordinate system, respectively, The prisms with free-form surface also satisfy following conditions regarding incident angles of $R_u$ on the first optical surface:

$$\begin{cases} \theta_{mi1} \geq \arcsin(1/n) \\ \theta_{mi2} \leq \arcsin(1/n) \end{cases} \quad (9)$$

where $\theta_{mi1}$ is an incident angle of $R_u$ emitted from the displays first striking the first optical surface (2), and $\theta_{mi2}$ is an incident angle of $R_u$ striking the first optical surface (2) at the second time, n is a refractive index of prism material, The mechanical tiling methods include a first mechanical tiling method and a second mechanical tiling method. In the first mechanical tiling method, bottom surfaces of two prisms to be tiled are subject to mechanical processing and then cemented together, the bottom surface is positioned between the first optical surface and the second optical surface. In the second mechanical tiling method, side surfaces of two prisms to be tiled are subject to mechanical processing and then cemented together, the side surface intersects with all of the first optical surface, the second optical surface and the third optical surface of the prism.

According to another embodiment of the present invention, the display channels can be tiled by optical tiling methods, the first optical surface, the second optical surface and the third optical surface of each prism satisfy following conditions (10)-(12):

$$18 \leq Z_{Pd} \leq 28 \quad (10)$$

$$1.5 Z_{Pd} - Z_{Pd} \leq 4 \quad (11)$$

$Z_{Pc} \geq$ the eye clearance distance, i.e., 15  (12)

where, $P_c$ is the intersection point of $R_u$ with the first optical surface upon total reflection, $P_d$ is the intersection point of chief ray $R_c$ in horizontal field of view with the first optical surface, $P_d$ is the intersection point of $R_c$ with the second optical surface.

The optical tiling methods comprise a first optical tiling method and a second optical tiling method. In the first optical tiling method, the bottom surfaces of both prisms to be tiled are directly cemented together. The bottom surface of the prism is positioned between the first optical surface and the second optical surface. In the second optical tiling method, the side surfaces of the respective prisms are directly cemented. The side surface of each prism intersects with the first optical surface, the second optical surface and the third optical surface of the prism.

The prism with free-form surfaces can be made of a material having a refractive index $N_{d1}$ of $1.4 < N_{d1} < 1.8$ and an Abbe number $V_{d1}$ above 20.

The prism with free-form surfaces has a first order focal length of $14 < f < 27$ mm.

In a first embodiment, the head-mounted display device comprises a first display channel and a second display channel tiled by the first mechanical tiling method, the first display channel is rotated by a first angle in YOZ plane about X-axis of a global coordinate system, the second display channel is rotated by ±180° about Z axis which is in a direction along viewing axis of a human eye, and then rotated by the first angle in the opposite direction about X-axis of the global coordinate system. The tiled head-mounted display according to the first embodiment has a horizontal field of view of at least 50° and a vertical field of view of at least 40°.

In a second embodiment, the head-mounted display device comprises a first display channel and a second display channel tiled by the second mechanical tiling method, the first display channel is rotated by a second angle in XOZ plane about Y-axis of a global coordinate system, the second display channel is rotated by the second angle in the opposite direction about Y-axis of the global coordinate system. The tiled head-mounted display according to the second embodiment has a horizontal field of view of at least 70° and a vertical field of view of at least 30°.

In a third embodiment, the head-mounted display device comprises a first display channel, a second display channel and a third display channel rotated about Y-axis of a global coordinate system by a predetermined angle, the second display channel is tiled with the first display channel and the third display channel using second mechanical tiling method, respectively. The tiled head-mounted display according to the third embodiment has a horizontal field of view of at least 100° and a vertical field of view of at least 30°.

In a fourth embodiment, the head-mounted display device comprises a first display channel, a second display channel, a third display channel and a fourth display channel rotated about Y-axis of the global coordinate system by a predetermined angle, the second display channel is tiled with the first display channel and the third display channel with the second mechanical tiling method, respectively, the third display channel is tiled with the second display channel and the fourth display channel using the second mechanical tiling method, respectively. The tiled head-mounted display according to the fifth embodiment has a horizontal field of view of at least 120° and a vertical field of view of at least 30°.

In a fifth embodiment, the head-mounted display device comprises a first display channel, a second display channel, a third display channel and a fourth display channel, the first display channel and the third display channel are rotated by a second angle in XOZ plane about Y-axis of a global coordinate system, the second display channel and the fourth display channel are rotated by the second angle in the opposite direction about Y-axis of the global coordinate system, the first display channel and the second display channel are tiled with the second mechanical tiling method, the third display channel and the fourth display channel are tiled with the second mechanical tiling method, the first display channel and the third display channel are tiled with the first mechanical tiling method, and the second display channel and the fourth display channel are tiled with the first mechanical tiling method. The tiled head-mounted display according to the fifth embodiment has a horizontal field of view of at least 70° and a vertical field of view of at least 50°.

In a sixth embodiment, the head-mounted display device comprises a first display channel, a second display channel, a third display channel, a fourth display channel, a fifth display channel and a sixth display channel, the first display channel, the second display channel and the third display channel are rotated about Y-axis of a global coordinate system by a predetermined angle, the fourth display channel, the fifth display channel and the sixth display channel are rotated about Y-axis of a global coordinate system by the predetermined angle, the second display channel is tiled with the first display channel and the third display channel using the second mechanical tiling method respectively, the fifth display channel is tiled with the fourth display channel and the sixth display channel using the second mechanical tiling method respectively, the first display channel and the fourth display channel are tiled with the first mechanical tiling method, the second display channel and the fifth display channel are tiled with the first mechanical tiling method, the third display channel and the sixth display channel are tiled with the first mechanical tiling method. The tiled head-mounted display according to the sixth embodiment has a horizontal field of view of at least 100° and a vertical field of view of at least 50°.

In a seventh embodiment, the head-mounted display device comprises a first display channel, a second display channel, a third display channel, a fourth display channel, a fifth display channel, a sixth display channel, a seventh display channel and an eighth display channel, the first display channel, the second display channel, the third display channel and the fourth display channel are rotated about Y-axis of a global coordinate system by a predetermined angle, the fifth display channel, the sixth display channel, the seventh display channel and the eighth display channel are rotated about Y-axis of a global coordinate system by the predetermined angle, the second display channel is tiled with the first display channel and the third display channel using the second mechanical tiling method respectively, the third display channel is tiled with the second display channel and the fourth display channel using the second mechanical tiling method respectively, the sixth display channel is tiled with the fifth display channel and the seventh display channel using the second mechanical tiling method respectively, the seventh display channel is tiled with the six display channel and the eighth display channel using the second mechanical tiling method respectively, the first display channel and the fifth display channel are tiled with the first mechanical tiling method, the second display channel and the sixth display channel are tiled with the first mechanical tiling method, the third display channel and the seventh display channel are tiled with the first mechanical tiling method, the fourth display channel and the eighth display channel are tiled with the first mechanical tiling method. The tiled head-mounted display according to the seventh embodiment has a horizontal field of view of at least 120° and a vertical field of view of at least 50°.

In a eighth embodiment, the tiled head-mounted display system comprises a first display channel and a second display channel tiled by the first optical tiling method, the first display channel is rotated by a first angle in YOZ plane about X-axis of a global coordinate system, the second display channel is rotated by ±180° about Z axis and then rotated by the first angle in the opposite direction about X-axis of the global coordinate system. The tiled head-mounted display according to the eighth embodiment has a horizontal field of view of at least 50° and a vertical field of view of at least 40°.

In a ninth embodiment, the tiled head-mounted display system comprises a first display channel and a second display channel tiled by the second optical tiling method, the first display channel is rotated by a second angle in XOZ plane about Y-axis of a global coordinate system, the second display channel is rotated by the second angle in the opposite direction about Y-axis of the global coordinate system. The tiled head-mounted display according to the ninth embodiment has a horizontal field of view of at least 70° and a vertical field of view of at least 30°.

In a tenth embodiment, the tiled head-mounted display system comprises a first display channel, a second display channel, a third display channel and a fourth display channel, the first display channel and the third display channel are rotated by a second angle in XOZ plane about Y-axis of a global coordinate system, the second display channel and the fourth display channel are rotated by the second angle in the opposite direction about Y-axis of the global coordinate system, the first display channel and the second display channel are tiled with the second optical tiling method, the third display channel and the fourth display channel are tiled with the second optical tiling method, the first display channel and the third display channel are tiled with the first optical tiling method, and the second display channel and the fourth display channel are tiled with the first optical tiling method. The tiled head-mounted display according to the tenth embodiment has a horizontal field of view of at least 70° and a vertical field of view of at least 50°.

According to yet another aspect of the present invention, the tiled head-mounted display system can further comprise an auxiliary lens with free-form surfaces. Each lens cooperates with the corresponding prism with free-form surfaces, so that the user is able to see external scenery for augmented reality application. The second optical surface of the prism is a semi-transmissive and semi-reflective mirror surface.

The optical tiled head-mounted display device according to the present invention is compact and lightweight, and the exit pupil planes of all display channels are coincident, thus avoiding pupil aberration and keeping pupil diameter and eye clearance constant. Furthermore, there is no resolution variance in the overall field of view, thus preventing additional distortion. The tiled head-mounted display device according to the present invention can be readily applicable to augmented reality. In comparison, for a conventional head-mounted display device to be used in augmented reality, it is necessary to introduce a half mirror into the device to fold optical path in order to achieve optical transmission, thus requiring a complex and bulky structure.

Furthermore, the surfaces of the prisms according to the present invention for optical tiling can be formed continuous together as larger optical surfaces, each larger surface can be fabricated in one time and thus it does not require additional processing for the tiling surface. In addition, all optical surfaces of the prism of the display channels in the head-mounted display device can be formed integrally, thus reducing difficulty and complexity of the tiling process.

BRIEF DESCRIPTION OF THE DRAWINGS

The present invention will become more fully understood from the detailed description given hereinafter and the accompanying drawings which are given by way of illustration only, and thus are not limitative of the present invention.

DETAILED DESCRIPTION OF THE INVENTION

The embodiments according to the present invention will be fully described with reference to the attached drawings. The present invention may, however, be embodied in various forms and should not be construed as limited to the embodiments set forth herein. Rather, these embodiments are provided so that this disclosure is thorough and complete and will fully convey the scope of the invention to those skilled in the art. Moreover, the features of the respective embodiments can also be combined in ways other than the specific embodiments described hereafter, and the technical solutions based on such combination will still fall within the scope of the present invention.

Figure 1A:
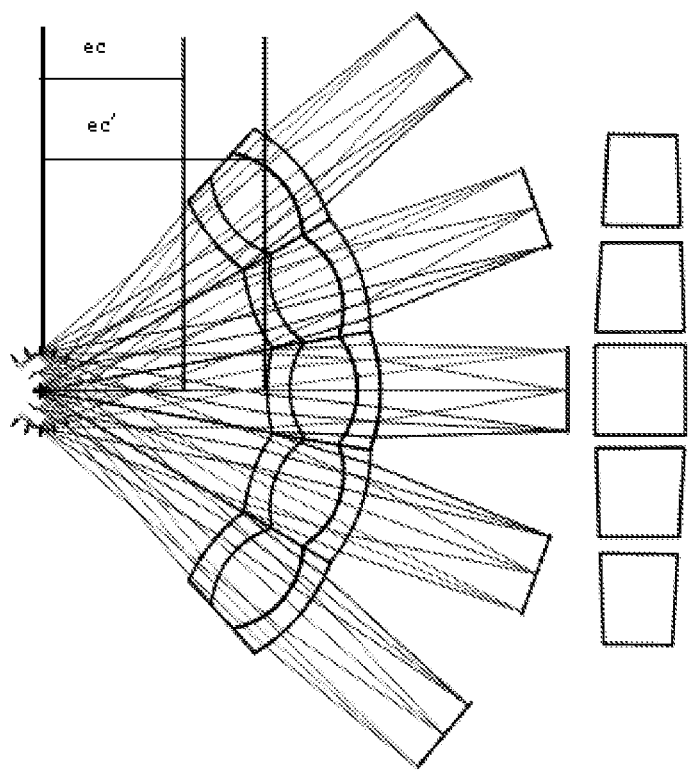
FIG. 1a and FIG. 1b are schematic views showing a tiled head-mounted display system based on conventional oculars with rotational symmetry.
Figure 1B:
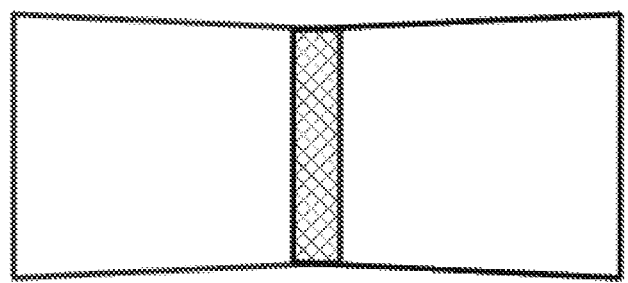
Figure 2A:
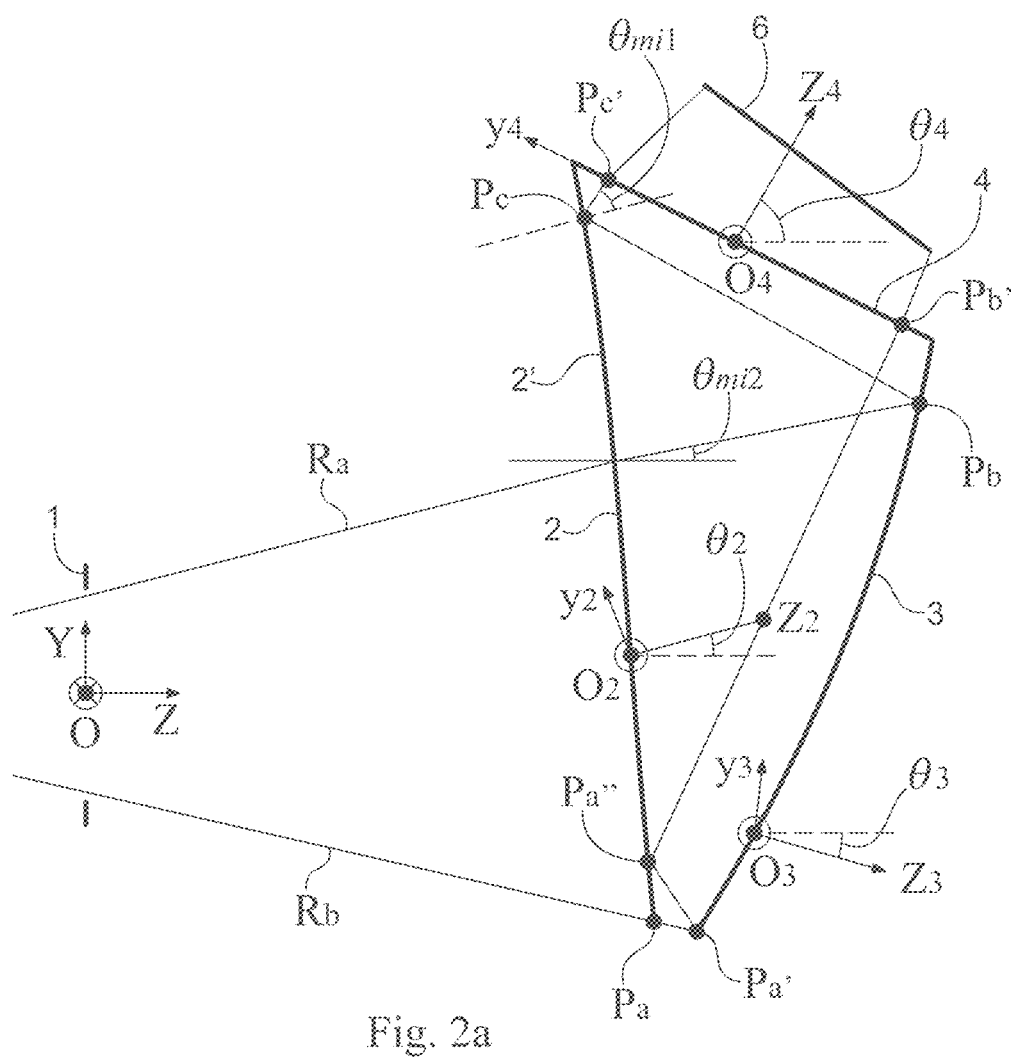
FIG. 2a and FIG. 2b are two-dimensional schematic view and three-dimensional schematic view of one display channel in a tiled head-mounted display system according to the present invention.
Figure 2B:
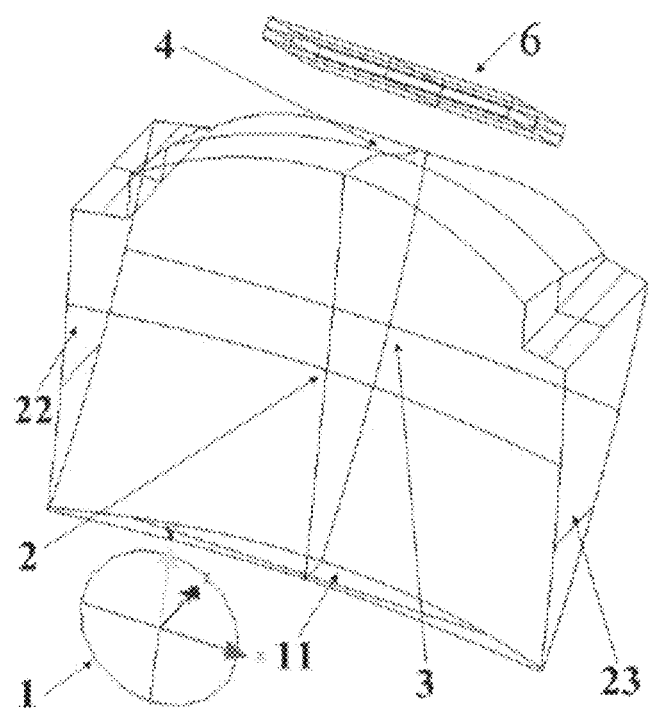

FIG. 2a and FIG. 2b are two-dimensional schematic view and three-dimensional schematic view of one display channel in a tiled head-mounted display system according to the present invention. In the drawings, the coordinate system is defined as: global coordinate origin O is exit pupil center; Z-axis is in a direction along the viewing axis of user's eye; Y-axis is perpendicular to Z-axis and extends right above the eye; X-axis is perpendicular to both Y-axis and Z-axis, constituting a Cartesian coordinate. One display channel of a tiled head-mounted display device according to the present invention can comprise a prism with three free-form optical surfaces and a micro-display. Because the display channel is designed by reverse optical path design, that is, the rays coming from exit pupil are refracted and reflected by the prism successively with free-form surfaces to the micro-display. For the convenience of description, the elements and surfaces are numbered starting from the exit pupil. Reference number 1 represents the exit pupil. The prism comprises a first optical surface 2, a second optical surface 3 and a third optical surface 4 in a counter-clockwise order relative to X-axis. The first optical surface 2 and the second optical surface 3 are free-form surfaces, the third optical surface 4 may be selected from free-form, spherical or non-spherical surface. The first optical surface 2 can be a concave transmissive surface on the user side, for example. The second optical surface 3 can be a concave reflective surface or semi-transmissive and semi-reflective surface on the user side for magnifying image, for example. When the tiled head-mounted display device is used for virtual environments, the third optical surface 4 can be a concave transmissive surface on the user's side. As shown in FIG. 2a, in reality, the light path in the head-mounted display device according to the invention starts from the micro-display 6. The lights emitted by the micro-display 6 such as a LCD enter into the prism through the third optical surface 4, and then are subject to total reflection on the inner side of the first optical surface 2, then reflected by the second optical surface 3 and finally enter into user's eye through the first optical surface 2.

The free-form surface equation of the first optical surface 2, the second optical surface 3 and the third optical surface 4 may follow (but are not limited to) any one of conditions (1) to (5).

$$z = \frac{c_x x^2 + c_y y^2}{1 + \{1 - (1+k_x)c_x^2 x^2 - (1+k_y)c_y^2 y^2\}^{1/2}} + \sum_{i=1}^{n} A_i \{(1-P_i)x^2 + (1+P_i)y^2\}^{i+1} \quad (1)$$

where z is the sag of the free-form surface measured along the z-axis of a local x, y, z coordinate system, $c_x$ is radius of curvature in the x direction in the xz-plane, $c_y$ is radius of curvature in the y direction in the yz-plane, $k_x$ is conic coefficient in x direction, $k_y$ is conic coefficient in y direction, $A_i$ are aspherical coefficients of 4, 6, 8, 10, ... 2n orders, $P_i$ are non-rotational symmetry coefficient of 4, 6, 8, 10, ... 2n orders, and the surface has rotational symmetry about z-axis;

$$z = \frac{c(x^2 + y^2)}{1 + sqrt(1 - (1+k)c^2(x^2 + y^2))} + \sum_{j=2}^{66} C_y x^m y^n, \quad (2)$$

$$j = [(m+n)^2 + m + 3n]/2 + 1$$

where z is the sag of the free-form surface measured along the z-axis of a local x, y, z coordinate system, c is radius of curvature of surface, $C_j$ is polynomial coefficients, m is an even number in the present invention;

$$z = \frac{c(x^2 + y^2)}{1 + sqrt(1 - (1+k)c^2(x^2 + y^2))} + \sum_{j=1}^{66} C_{j+1} Z_j \quad (3)$$

where z is the sag of the free-form surface measured along the z-axis of a local x, y, z coordinate system, c is radius of curvature of surface, k is conic coefficient, $Z_j$ is Zernike polynomial, $C_{j+1}$ is coefficients for $Z_j$;

$$z = \frac{c_x x^2 + c_y y^2}{1 + sqrt(1 - (1+k_x)c_x x^2 - (1+k_y)c_y y^2)} + \sum_{j=1}^{37} C_j x^{2m} y^n \quad (4)$$

$$2m + n \leq 10, m = 0, 1, 2, 3, 4, 5, n = 0, 1, \ldots, 10$$

where z is the sag of the free-form surface measured along the z-axis of a local x, y, z coordinate system, c is the vertex curvature, k is the conic constant, $c_x$ is radius of curvature of surface in sagittal direction, $c_y$ is radius of curvature of surface in tangential direction, and $C_j$ is the coefficient for $x^{2m} y^n$.

$$z = \frac{cx^2}{1 + [1 - (1+k)c^2 x^2]^{1/2}} + Ax^4 + Bx^6 + Cx^8 + Dx^{10} \quad (5)$$

where z is the sag of the free-form surface measured along the z-axis of a local x, y, z coordinate system, c is the radius of curvature, k is conic coefficient, A, B, C, D are aspheric coefficients of 4, 6, 8 and 10 orders, respectively.

The micro-display in each display channel can be any types of flat panel displays such as LCD displays, OLED displays. The prism can be formed of plastic or glass optical material by injection molding, micromachining, which will not be discussed in detail herein.

The tiled head-mounted display device according to the present invention includes a number of display channels each comprising the prism with free-form surface described above and a corresponding micro-display. The display channels are tiled so that the overall field of view of the tiled device can be substantially a summation of individual field of view of each display channel and the center of exit pupil of each display channel in the tiled device is coincident with each other.

Figure 3:
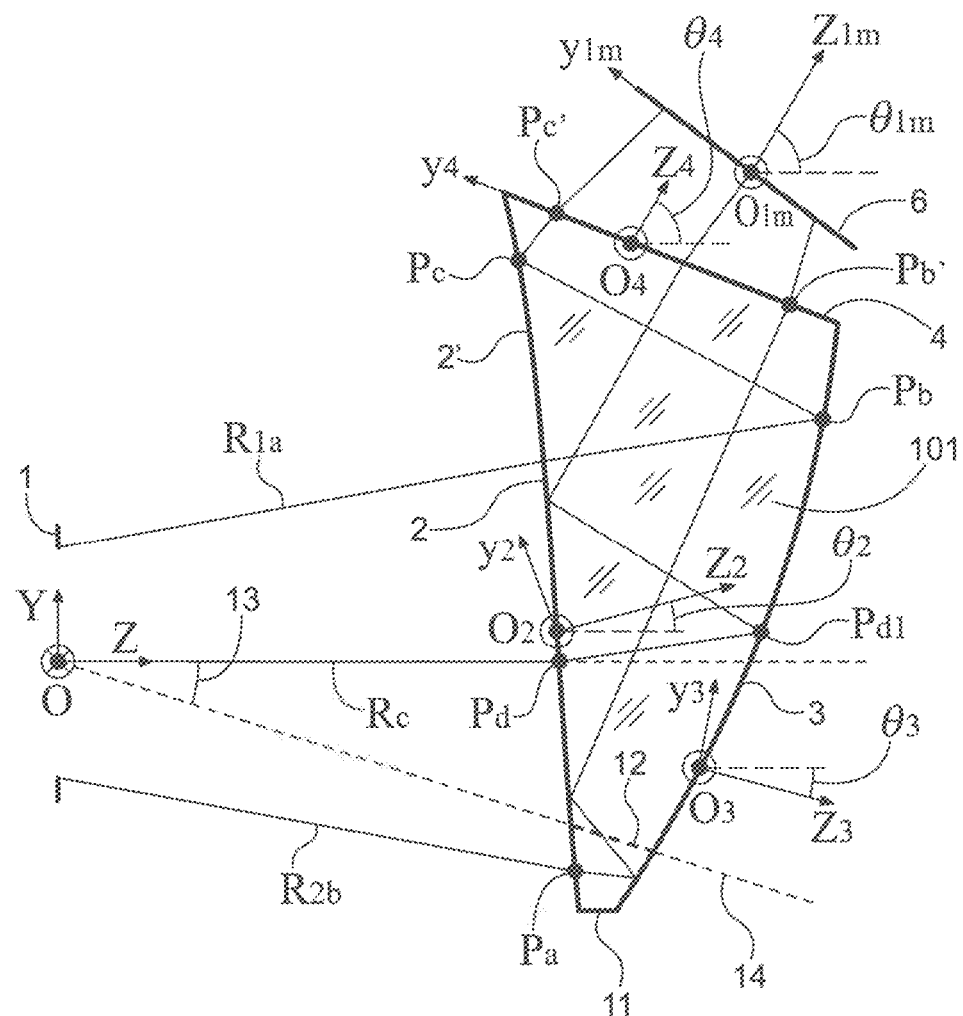
FIG. 3 is a two dimensional schematic view of a single display channel in a tiled head-mounted display system according to the present invention with a mechanical tiling method.
Figure 4:
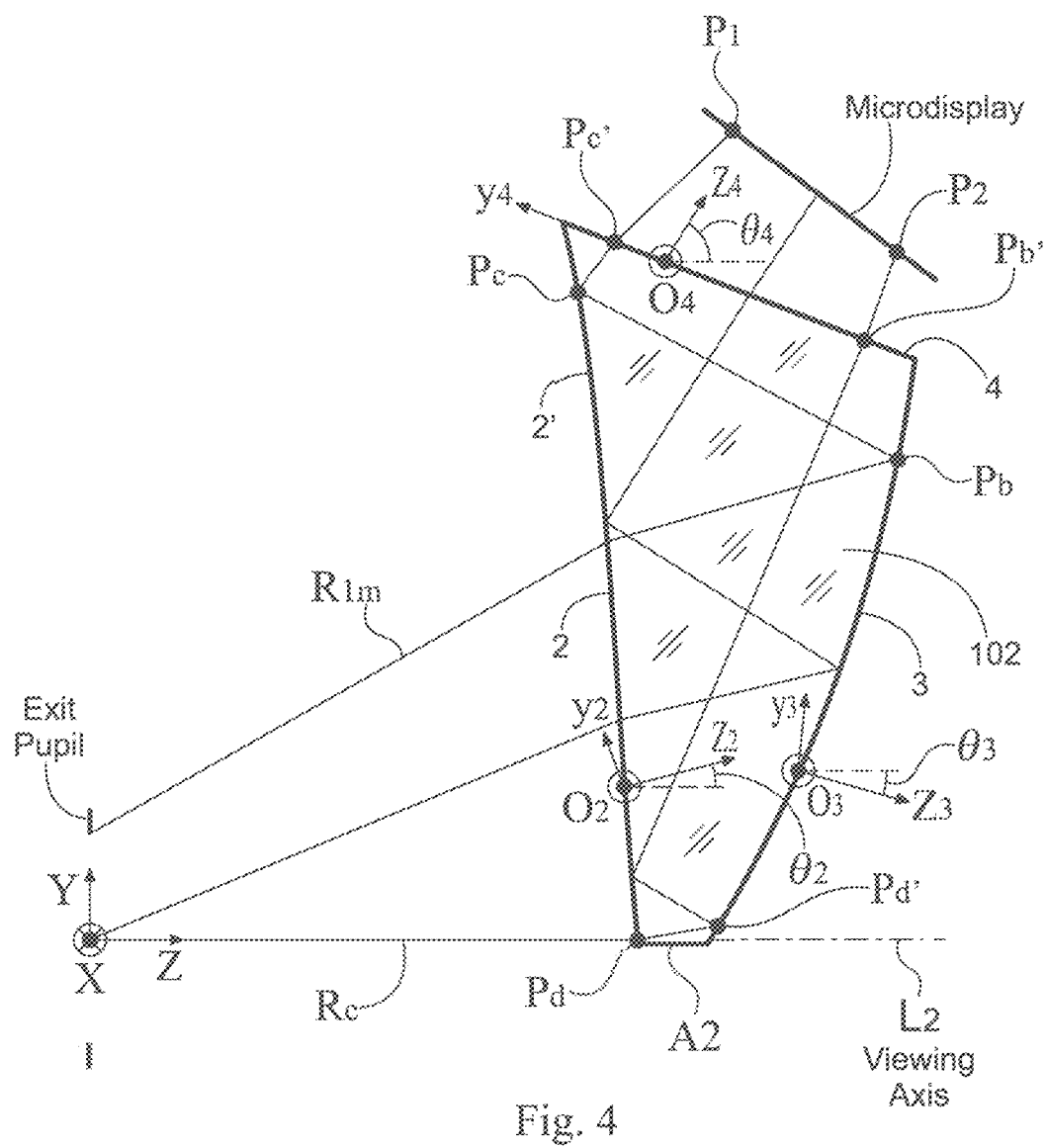
FIG. 4 is a two dimensional schematic view of a single display channel in a tiled head-mounted display system according to the present invention with an optical tiling method.

Tiling methods of the tiled head-mounted displays according to the present invention can be categorized as mechanical tiling methods and optical tiling methods. FIG. 3 is a two dimensional schematic view of a single display channel in a tiled head-mounted display system according to the present invention with a mechanical tiling method. FIG. 4 is a two dimensional schematic view of a single display channel in a tiled head-mounted display system according to the present invention with an optical tiling method.

The tiling methods comprise cementing the prisms with free-form surfaces of display channels by methods such as adhering, gluing, bonding and welding or integrating the prisms by injection molding.

When display channels are tiled by so-called mechanical tiling method according to the present invention as shown in FIG. 3, the first optical surface 2, the second optical surface 3 and the third optical surface 4 of each prism 101 may satisfy following conditions (6)-(8):

$$\begin{cases} 0.5 \leq Z_{Pa'} - Z_{Pa} \leq 4 \\ Y_{Pa'} - Y_{Pa} \leq 0 \\ Y_{Pa''} - Y_{Pa} \geq 0 \end{cases} \quad (6)$$

$$\begin{cases} Y_{Pb'} - Y_{Pb} \geq 0 \\ -3 \leq Z_{Pb'} - Z_{Pb} \leq 0 \end{cases} \quad (7)$$

$$\begin{cases} -4 \leq Y_{Pc} - Y_{Pc'} \leq 0 \\ 0 \leq Z_{Pc} - Z_{Pc'} \leq 2 \end{cases} \quad (8)$$

where $R_u$ is the top marginal ray of the maximum field of view in positive Y direction, $R_b$ is the light ray at lower boundary of the maximum field of view in negative Y direction; $P_a$ is an intersection point at which $R_b$ is transmitted through the first optical surface 2, $P_a'$ is an intersection point of $R_b$ with the second optical surface 3 and $P_a''$ is an intersection point of $R_b$ with the first optical surface 2 upon total reflection; $P_b$ is an intersection point between $R_u$ and the second optical surface 3, $P_b'$ is an intersection point between $R_b$ and the third optical surface 4; $P_c$ is an intersection point at which $R_u$ is reflected on the first optical surface 2, $P_c'$ is an intersection point between $R_u$ and the third optical surface 4, Y, Z are coordinates of each point in global coordinate system, respectively.

The prism 101 must also satisfy following conditions regarding incident angles of $R_u$ on the first optical surface 2:

$$\begin{cases} \theta_{mi1} \geq \arcsin(1/n) \\ \theta_{mi2} \leq \arcsin(1/n) \end{cases} \quad (9)$$

where $\theta_{mi1}$ is an incident angle of $R_u$ emitted from the displays first striking the first optical surface 2, and $\theta_{mi2}$ is an incident angle of $R_u$ striking the first optical surface 2 at the second time, n is a refractive index of prism material.

Mechanical tiling methods can include a first mechanical tiling method and a second mechanical tiling method. In the first mechanical tiling method, bottom surfaces 12 of two prisms are subject to mechanical processing such as cutting and polishing and then cemented together. In FIG. 3, the bottom surface 12 indicated by dotted lines is positioned between the first optical surface 2 and the second optical surface 3. In the second mechanical tiling method, side surfaces of two prisms, for example, side surfaces 22 and 23 in FIG. 2a are subject to mechanical processing such as cutting and polishing and then cemented together. The side surface may intersect with all of the first optical surface 2, the second optical surface 3 and the third optical surface 4 of prism.

When display channels are tiled by so-called optical tiling method according to the present invention as shown in FIG. 4, the first optical surface 2, the second optical surface 3 and the third optical surface 4 of each prism 102 may satisfy following conditions (10)-(12):

$$18 \leq Z_{P_d} \leq 28 \tag{10}$$

$$1.5 \leq Z_{P_d} - Z_{P_d} \leq 3 \tag{11}$$

$$Z_{P_c} \geq \text{the eye clearance distance, i.e., 15} \tag{12}$$

where, $P_c$ is an intersection point of $R_u$ with the first optical surface 2 upon total reflection, $P_d$ is an intersection point of chief ray $R_c$ in horizontal field of view and the first optical surface 2, $P_d$ is an intersection point of $R_c$ with the second optical surface 3.

Similar to mechanical tiling methods, optical tiling methods can also comprise a first optical tiling method and a second optical tiling method. In the first optical tiling method, the bottom surfaces 11 of both prisms in two display channels to be tiled can be directly cemented together or the two prisms can be formed integrally by injection molding, the bottom surface 11 of the prism is positioned between the first optical surface 2 and the second optical surface 3; In the second optical tiling method, the side surface of the respective prisms 11 such as side surfaces 23 can be directly cemented or the two prisms can be formed integrally by injection molding. The side surface intersects with the first optical surface, the second optical surface and the third optical surface of the prism.

Because display channels are tilted with respect to their origin position in the mechanical tiling device, the tiled head-mounted display formed by the mechanical tiling methods has a smaller exit pupil diameter and eye clearance compared with the tiled head-mounted displays formed by the optical tiling methods. For the tiled head-mounted display formed by the mechanical tiling methods, it is required to correct trapezoidal distortion. For the tiled head-mounted displays formed by the optical tiling methods, it is not necessary to correct trapezoidal distortions due to positional change and the user will not see discontinuous images even if his/her eyeballs are moving. In some cases, user might see stitches between different display channels in the field of view in the tiled head-mounted display formed by the mechanical tiling methods while the tiled head-mounted display formed by the optical tiling methods does not suffer from this problem.

The embodiments of both the mechanical tiled head-mounted displays and the optical tiled head-mounted displays mentioned above will be described in detail hereafter. The invention, however, is not limited to the specific embodiment described in follows.

First Embodiment

Figure 5A:
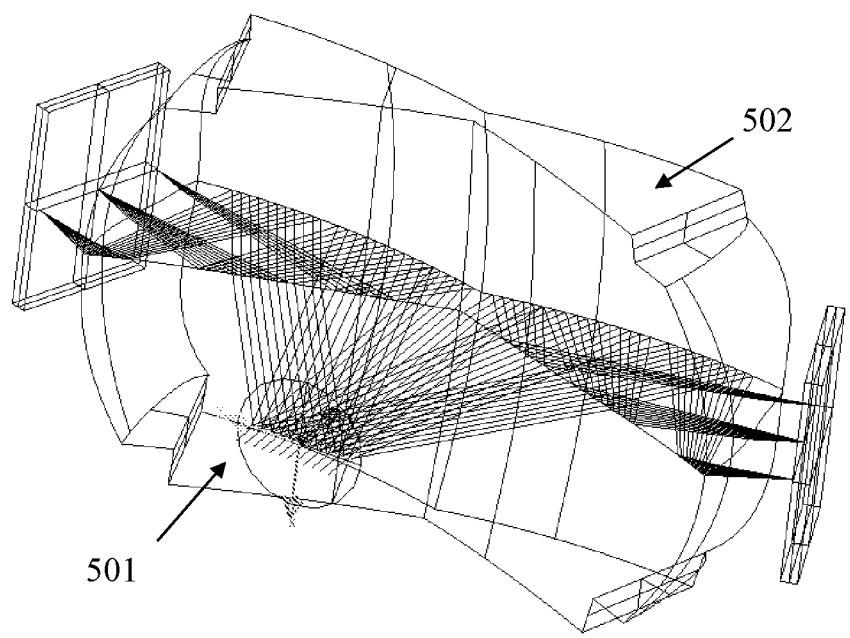
FIG. 5a is a schematic view of a tiled head-mounted display system according to a first embodiment of the present invention.
Figure 5B:
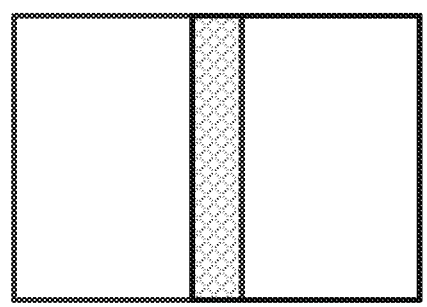
FIG. 5b is a schematic view illustrating field of view of the tiled head-mounted display system according to a first embodiment of the present invention.

FIG. 5a is a schematic view of a tiled head-mounted display system according to a first embodiment of the present invention; FIG. 5b is a schematic view illustrating field of view of the tiled head-mounted display system according to a first embodiment of the present invention. As shown in FIG. 5a, a head-mounted display device according to the first embodiment of the present invention can comprise a first display channel 501 and a second display channel 502 tiled by the first mechanical tiling method as described above. The first display channel 501 is rotated by a first angle in YOZ plane about X-axis of a global coordinate system. The second display channel 502 is rotated by ±180° about Z axis which is in a direction along viewing axis of a human eye, and then rotated by the first angle in the opposite direction about X-axis of the global coordinate system. As shown in FIG. 5b, the tiled head-mounted display according to the first embodiment of the present invention has a horizontal field of view of at least 50° and a vertical field of view of at least 40°.

Second Embodiment

Figure 6A:
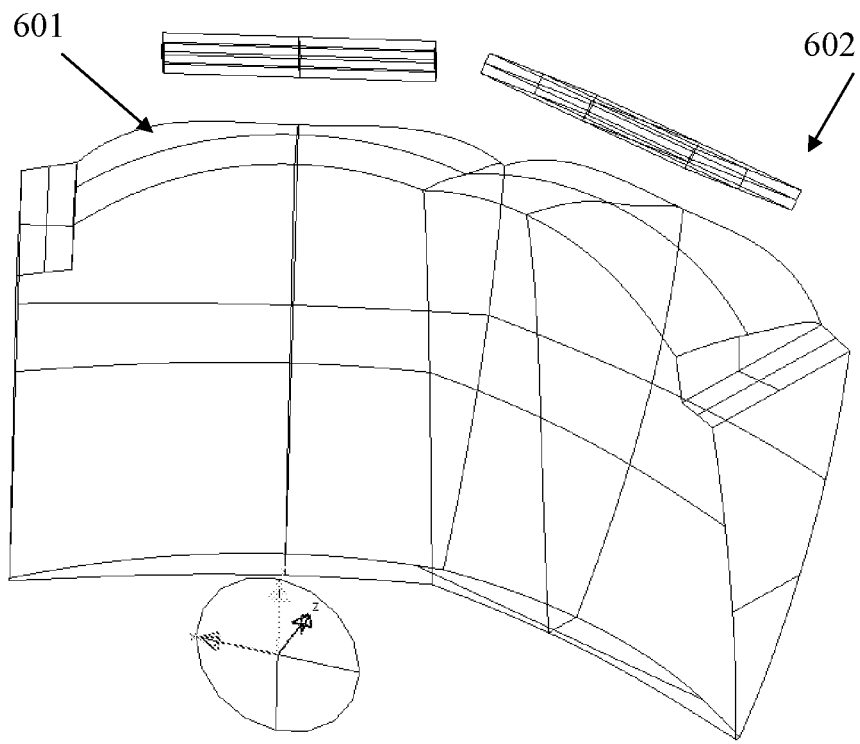
FIG. 6a is a schematic view of a tiled head-mounted display system according to a second embodiment of the present invention.
Figure 6B:
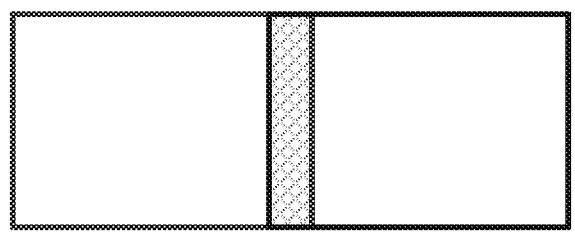
FIG. 6b is a schematic view illustrating field of view of the tiled head-mounted display system according to a second embodiment of the present invention.

FIG. 6a is a schematic view of a tiled head-mounted display system according to a second embodiment of the present invention; FIG. 6b is a schematic view illustrating field of view of the tiled head-mounted display system according to a second embodiment of the present invention. As shown in FIG. 6a, a head-mounted display device according to the second embodiment of the present invention can comprise a first display channel 601 and a second display channel 602 tiled by the second mechanical tiling method as described above. The first display channel 601 is rotated by a second angle in XOZ plane about Y-axis of a global coordinate system. The second display channel 602 is rotated by the second angle in the opposite direction about Y-axis of the global coordinate system. As shown in FIG. 6b, the tiled head-mounted display according to the second embodiment of the present invention has a horizontal field of view of at least 70° and a vertical field of view of at least 30°.

Third Embodiment

Figure 7A:
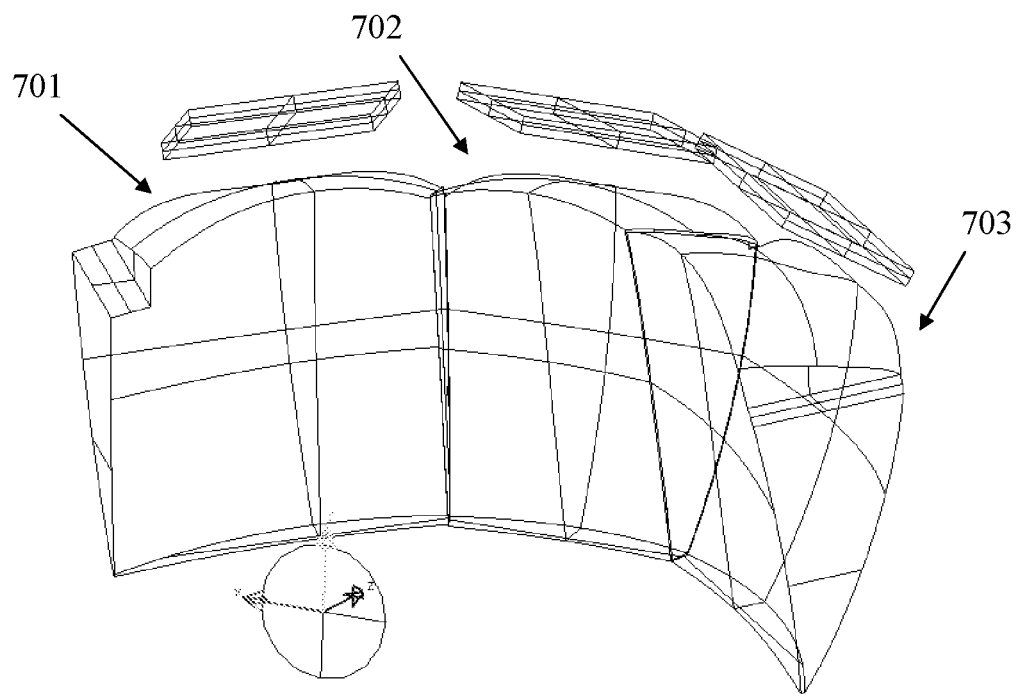
FIG. 7a is a schematic view of a tiled head-mounted display system according to a third embodiment of the present invention.
Figure 7B:
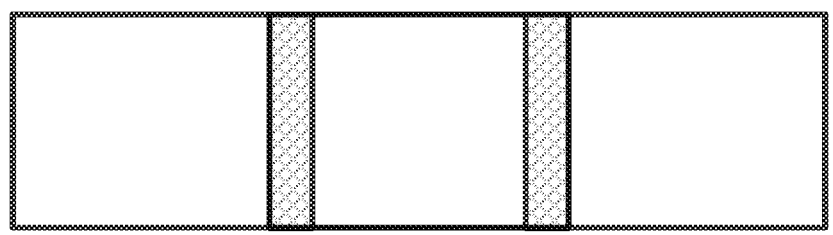
FIG. 7b is a schematic view illustrating field of view of the tiled head-mounted display system according to a third embodiment of the present invention.

FIG. 7a is a schematic view of a tiled head-mounted display system according to a third embodiment of the present invention; FIG. 7b is a schematic view illustrating field of view of the tiled head-mounted display system according to a third embodiment of the present invention. As shown in FIG. 7a, a head-mounted display device according to the third embodiment of the present invention can comprise a first display channel 701, a second display channel 702 and a third display channel 703 rotated by a predetermined angle about Y-axis of a global coordinate system. The second display channel 702 is tiled with the first display channel 701 and the third display channel 703 using the second mechanical tiling method, respectively. As shown in FIG. 7b, the tiled head-mounted display according to the third embodiment of the present invention has a horizontal field of view of at least 100° and a vertical field of view of at least 30°.

Fourth Embodiment

Figure 8A:
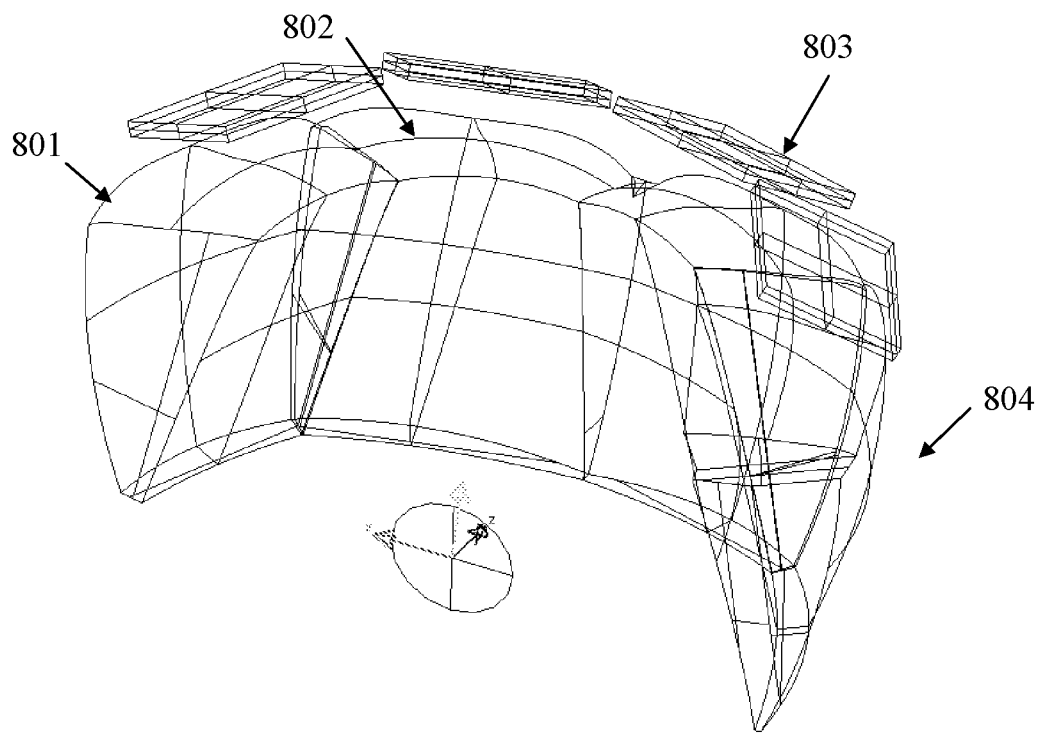
FIG. 8a is a schematic view of a tiled head-mounted display system according to a fourth embodiment of the present invention.
Figure 8B:
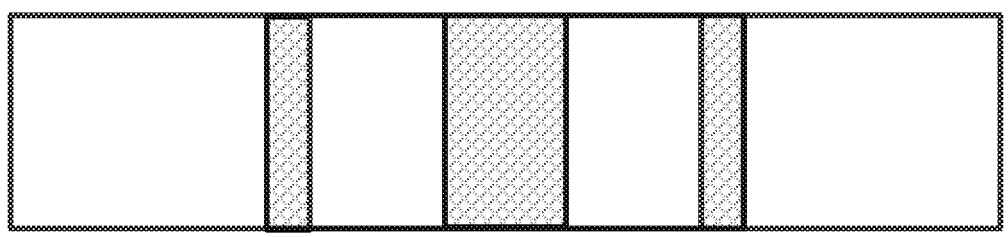
FIG. 8b is a schematic view illustrating field of view of the tiled head-mounted display system according to a fourth embodiment of the present invention.

FIG. 8a is a schematic view of a tiled head-mounted display system according to a fourth embodiment of the present invention; FIG. 8b is a schematic view illustrating field of view of the tiled head-mounted display system according to a fourth embodiment of the present invention. As shown in FIG. 8a, a head-mounted display device according to the fourth embodiment of the present invention can comprise a first display channel 801, a second display channel 802, a third display channel 803 and a fourth display channel 804 rotated by a predetermined angle about Y-axis of a global coordinate system. The second display channel 802 is tiled with the first display channel 801 and the third display channel 803 using the second mechanical tiling method, respectively. The third display channel 803 is tiled with the second display channel 802 and the fourth display channel 804 using the second mechanical tiling method, respectively. As shown in FIG. 8b, the tiled head-mounted display according to the fourth embodiment of the present invention has a horizontal field of view of at least 120° and a vertical field of view of at least 30°.

Fifth Embodiment

Figure 9A:
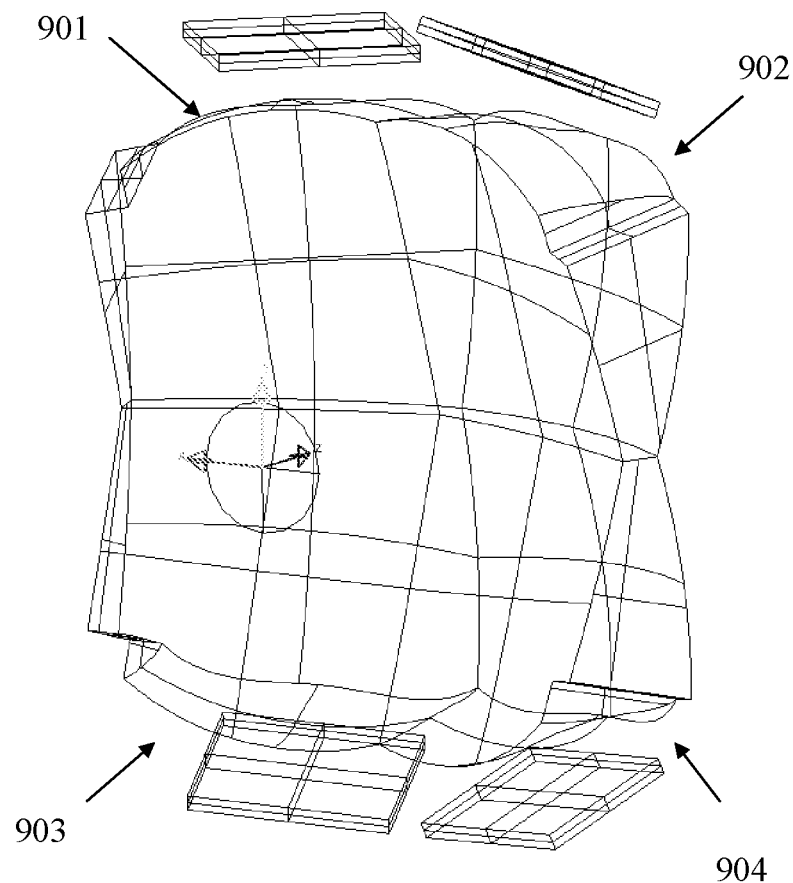
FIG. 9a is a schematic view of a tiled head-mounted display system according to a fifth embodiment of the present invention.
Figure 9B:
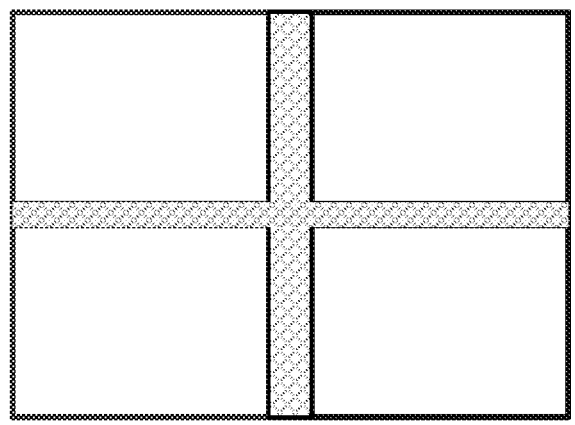
FIG. 9b is a schematic view illustrating field of view of the tiled head-mounted display system according to a fifth embodiment of the present invention.

FIG. 9a is a schematic view of a tiled head-mounted display system according to a fifth embodiment of the present invention; FIG. 9b is a schematic view illustrating field of view of the tiled head-mounted display system according to a fifth embodiment of the present invention. As shown in FIG. 9a, a head-mounted display device according to the fifth embodiment of the present invention can comprise a first display channel 901, a second display channel 902, a third display channel 903 and a fourth display channel 904. The first display channel 901 and the third display channel 903 are rotated by a second angle in XOZ plane about Y-axis of a global coordinate system. The second display channel 902 and the fourth display channel 904 are rotated by the second angle in the opposite direction about Y-axis of the global coordinate system. The first display channel 901 and the second display channel 902 are tiled with the second mechanical tiling method. The third display channel 903 and the fourth display channel 904 are tiled with the second mechanical tiling method. The first display channel 901 and the third display channel 903 are tiled with the first mechanical tiling method. The second display channel 902 and the fourth display channel 904 are tiled with the first mechanical tiling method. As shown in FIG. 9b, the tiled head-mounted display according to the fifth embodiment of the present invention has a horizontal field of view of at least 70° and a vertical field of view of at least 50°.

Sixth Embodiment

Figure 10A:
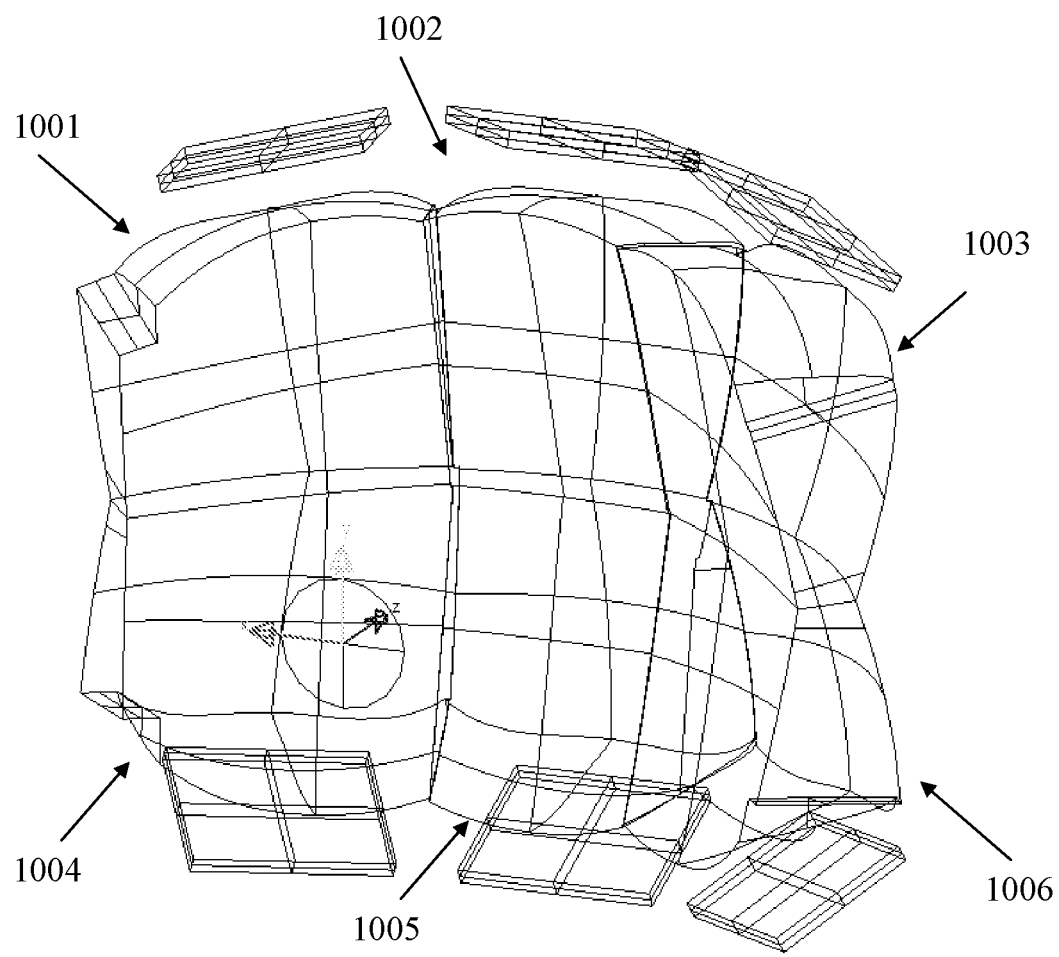
FIG. 10a is a schematic view of a tiled head-mounted display system according to a sixth embodiment of the present invention.
Figure 10B:
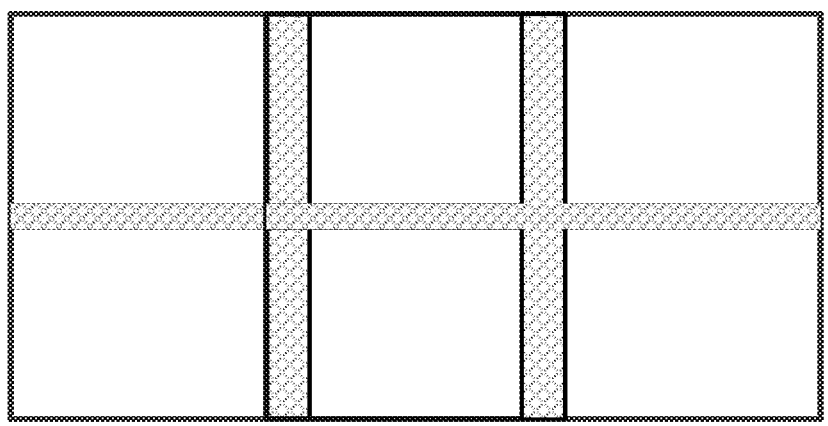
FIG. 10b is a schematic view illustrating field of view of the tiled head-mounted display system according to a sixth embodiment of the present invention.

FIG. 10a is a schematic view of a tiled head-mounted display system according to a sixth embodiment of the present invention; FIG. 10b is a schematic view illustrating field of view of the tiled head-mounted display system according to a sixth embodiment of the present invention. As shown in FIG. 10a, a head-mounted display device according to the sixth embodiment of the present invention can comprise a first display channel 1001, a second display channel 1002, a third display channel 1003, a fourth display channel 1004, a fifth display channel 1005 and a sixth display channel 1006. The first display channel 1001, the second display channel 1002 and the third display channel 1003 are rotated by a predetermined angle about Y-axis of a global coordinate system. The fourth display channel 1004, the fifth display channel 1005 and the sixth display channel 1006 are rotated by a predetermined angle about Y-axis of a global coordinate system. The second display channel 1002 is tiled with the first display channel 1001 and the third display channel 1003 using the second mechanical tiling method respectively. The fifth display channel 1005 is tiled with the fourth display channel 1004 and the sixth display channel 1006 using the second mechanical tiling method respectively. The first display channel 1001 and the fourth display channel 1004 are tiled with the first mechanical tiling method. The second display channel 1002 and the fifth display channel 1005 are tiled with the first mechanical tiling method. The third display channel 1003 and the sixth display channel 1006 are tiled with the first mechanical tiling method. As shown in FIG. 10b, the tiled head-mounted display according to the sixth embodiment of the present invention has a horizontal field of view of at least 100° and a vertical field of view of at least 50°.

Seventh Embodiment

Figure 11A:
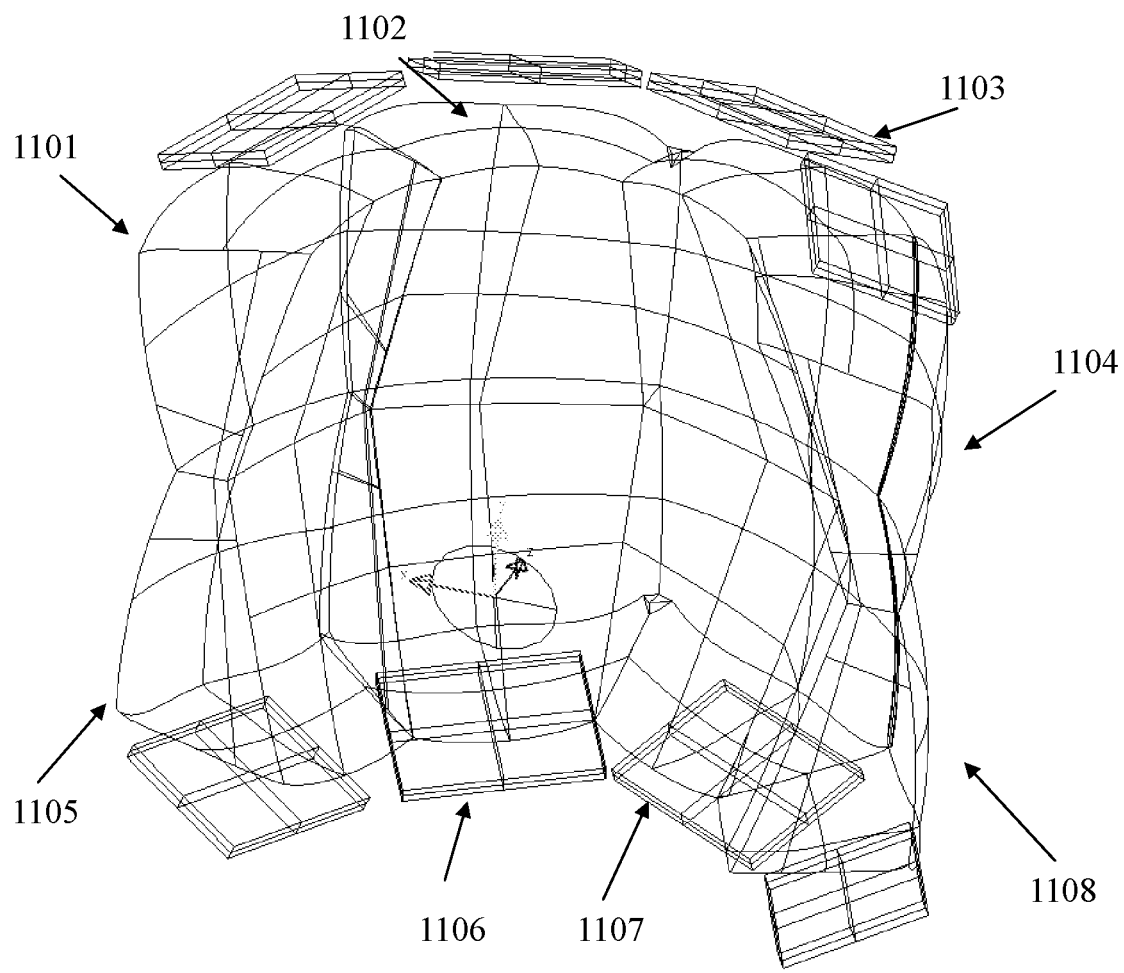
FIG. 11a is a schematic view of a tiled head-mounted display system according to a seventh embodiment of the present invention.
Figure 11B:
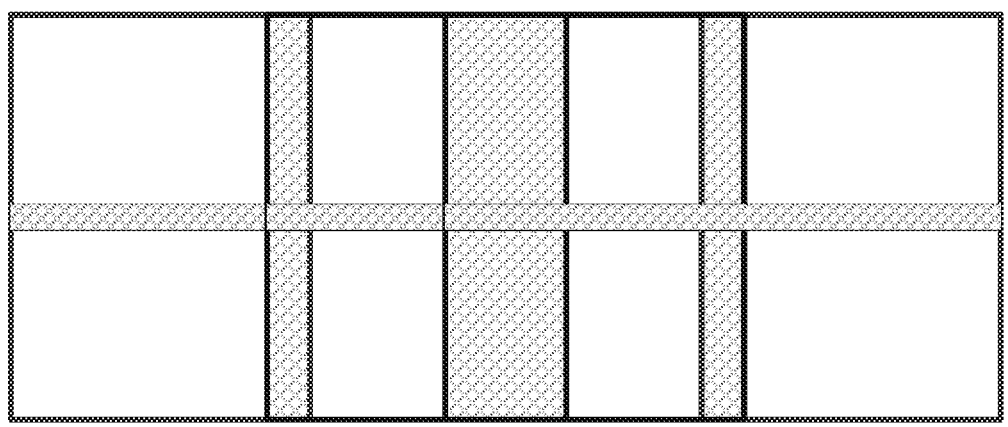
FIG. 11b is a schematic view illustrating field of view of the tiled head-mounted display system according to a seventh embodiment of the present invention.

FIG. 11a is a schematic view of a tiled head-mounted display system according to a seventh embodiment of the present invention; FIG. 11b is a schematic view illustrating field of view of the tiled head-mounted display system according to a seventh embodiment of the present invention. As shown in FIG. 11a, a head-mounted display device according to the seventh embodiment of the present invention can comprise a first display channel 1101, a second display channel 1102, a third display channel 1103, a fourth display channel 1104, a fifth display channel 1105, a sixth display channel 1106, a seventh display channel 1107 and an eighth display channel 1108. The first display channel 1101, the second display channel 1102, the third display channel 1103 and the fourth display channel 1104 are rotated by a predetermined angle about Y-axis of a global coordinate system. The fifth display channel 1105, the sixth display channel 1106, the seventh display channel 1107 and the eighth display channel 1108 are rotated by a predetermined angle about Y-axis of a global coordinate system. The second display channel 1102 is tiled with the first display channel 1101 and the third display channel 1103 using the second mechanical tiling method respectively. The third display channel 1103 is tiled with the second display channel 1102 and the fourth display channel 1104 using the second mechanical tiling method respectively. The sixth display channel 1106 is tiled with the fifth display channel 1105 and the seventh display channel 1107 using the second mechanical tiling method respectively. The seventh display channel 1107 is tiled with the six display channel 1106 and the eighth display channel 1108 using the second mechanical tiling method respectively. The first display channel 1101 and the fifth display channel 1005 are tiled with the first mechanical tiling method. The second display channel 1102 and the sixth display channel 1106 are tiled with the first mechanical tiling method. The third display channel 1103 and the seventh display channel 1107 are tiled with the first mechanical tiling method. The fourth display channel 1104 and the eighth display channel 1108 are tiled with the first mechanical tiling method. As shown in FIG. 11b, the tiled head-mounted display according to the seventh embodiment of the present invention has a horizontal field of view of at least 120° and a vertical field of view of at least 50°.

Eighth Embodiment

A tiled head-mounted display system according to a eighth embodiment of the present invention can comprise a first display channel and a second display channel tiled by the first optical tiling method as described above, which is similar to the illustration of FIG. 5a in structure. The first display channel is rotated by a first angle in YOZ plane about X-axis of a global coordinate system. The second display channel is rotated by ±180° about Z axis and then rotated by the first angle in the opposite direction about X-axis of the global coordinate system. The tiled head-mounted display according to the eighth embodiment of the present invention has a horizontal field of view of at least 50° and a vertical field of view of at least 40°.

Ninth Embodiment

A tiled head-mounted display system according to a ninth embodiment of the present invention can comprise a first display channel and a second display channel tiled by the second optical tiling method as described above, which is similar to the illustration of FIG. 6a in structure. The first display channel is rotated by a second angle in XOZ plane about Y-axis of a global coordinate system. The second display channel is rotated by the second angle in the opposite direction about Y-axis of the global coordinate system. The tiled head-mounted display according to the ninth embodiment of the present invention has a horizontal field of view of at least 70° and a vertical field of view of at least 30°.

Tenth Embodiment

A tiled head-mounted display system according to a tenth embodiment of the present invention can comprise a first display channel, a second display channel, a third display channel and a fourth display channel, which is similar to the illustration of FIG. 9a in structure. The first display channel and the third display channel are rotated by a second angle in XOZ plane about Y-axis of a global coordinate system. The second display channel and the fourth display channel are rotated by the second angle in the opposite direction about Y-axis of the global coordinate system. The first display channel and the second display channel 902 are tiled with the second optical tiling method. The third display channel 903 and the fourth display channel 904 are tiled with the second optical tiling method. The first display channel 901 and the third display channel 903 are tiled with the first optical tiling method. The second display channel 902 and the fourth display channel 904 are tiled with the first optical tiling method. The tiled head-mounted display according to the tenth embodiment of the present invention has a horizontal field of view of at least 70° and a vertical field of view of at least 50°.

Tiled Head-Mounted Display Device for Augmented Environment Applications

Figure 12:
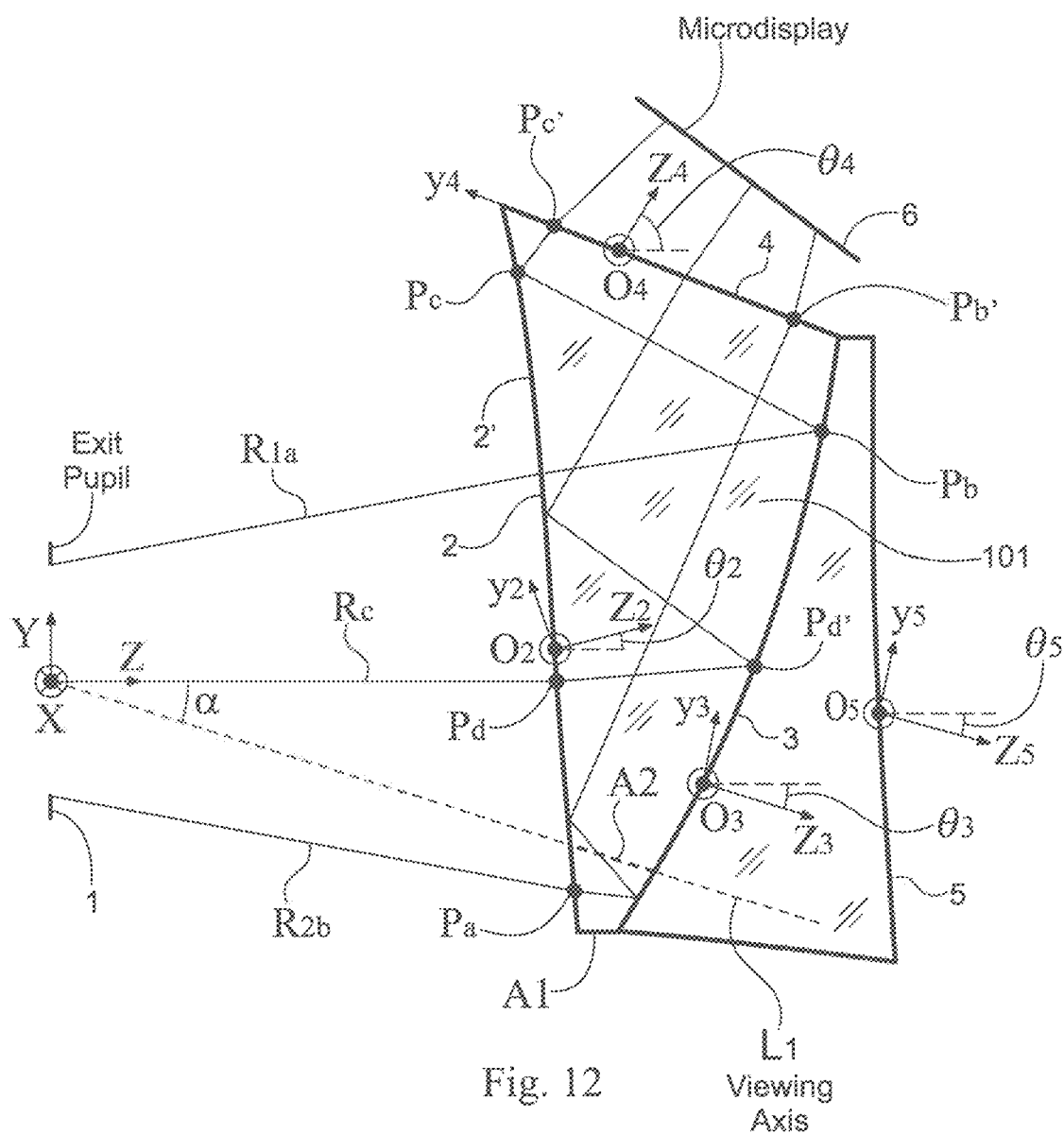
FIG. 12 is a two dimensional schematic view of one display channel in a tiled head-mounted display system for augmented environment according to the present invention.

In tiled head-mounted display devices according to the ten embodiments discussed above, if the second optical surface 3 of the prism in each display channel is coated with a reflective film to be formed as a reflective surface, the tiled head-mounted display devices can be mainly used for virtual environment application. If the second optical surface 3 of the prism in each display channel can be coated with a transflective film to be formed as a semi-transmissive and semi-reflective surface, an head-mounted display device for augmented environment application can be formed by adding an auxiliary lens with free-form surfaces in the display device, so that the lens and the prisms can constitute a focus-free system and allow user to see through the display device to observe outside real world. FIG. 12 is a two dimensional schematic view of one display channel in a tiled head-mounted display system for augmented environment according to the present invention. Therefore the embodiments as discussed above can be used for augmented environment by adding an auxiliary lens with free-form surfaces.

Figure 13A:
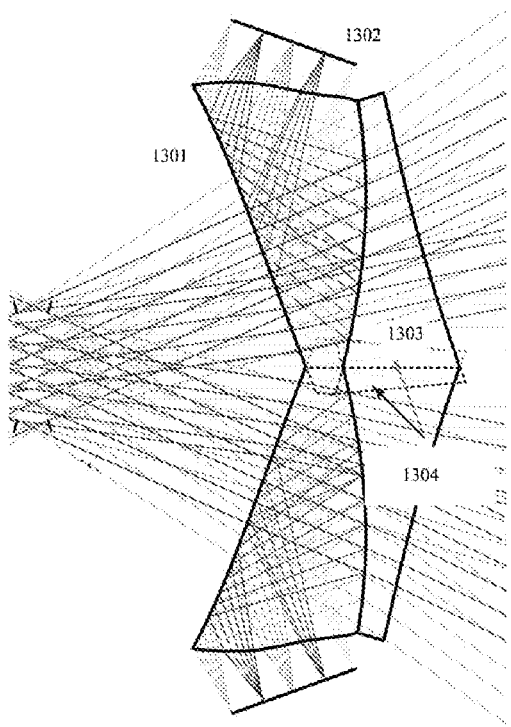
FIG. 13a and FIG. 13b are two-dimensional schematic view and three-dimensional schematic view of a tiled head-mounted display system for augmented environment according to the present invention.
Figure 13B:
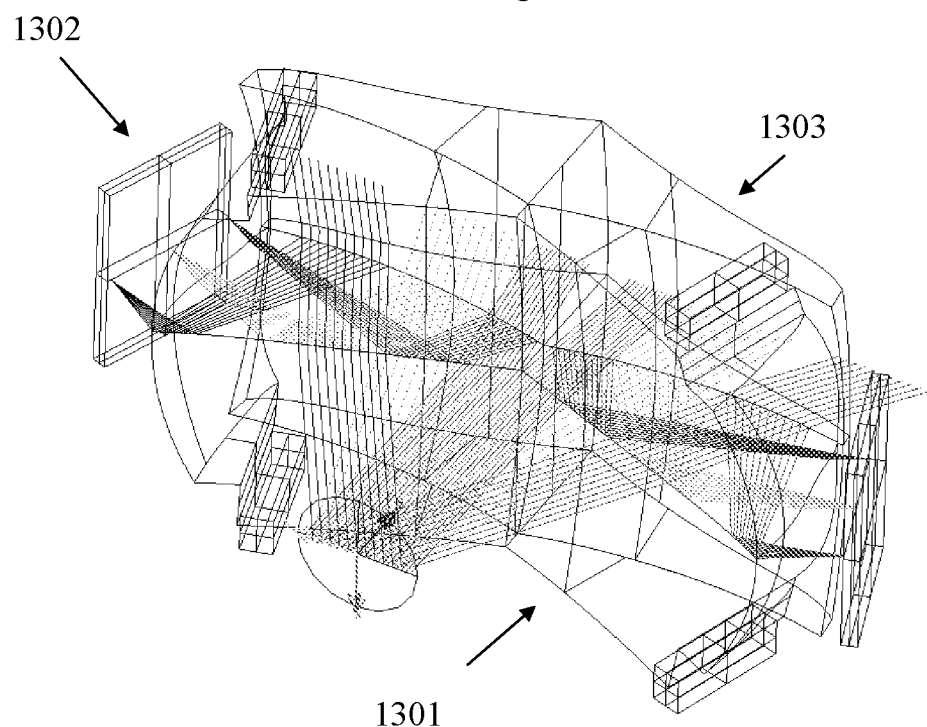

FIG. 13a and FIG. 13b are two-dimensional schematic view and three-dimensional schematic view of a tiled head-mounted display system for augmented environment according to the present invention. As shown in FIG. 13a, the tiled head-mounted display device can comprise display channels each comprising a prism 1301 with free-form surfaces, a micro-display device 1302 and a lens 1303 with free-form surfaces 1304. The display channels can be tiled by the first mechanical tiling method, thus a part of prism 1301 and a part of lens 1303 are removed during tiling.

Figure 14:
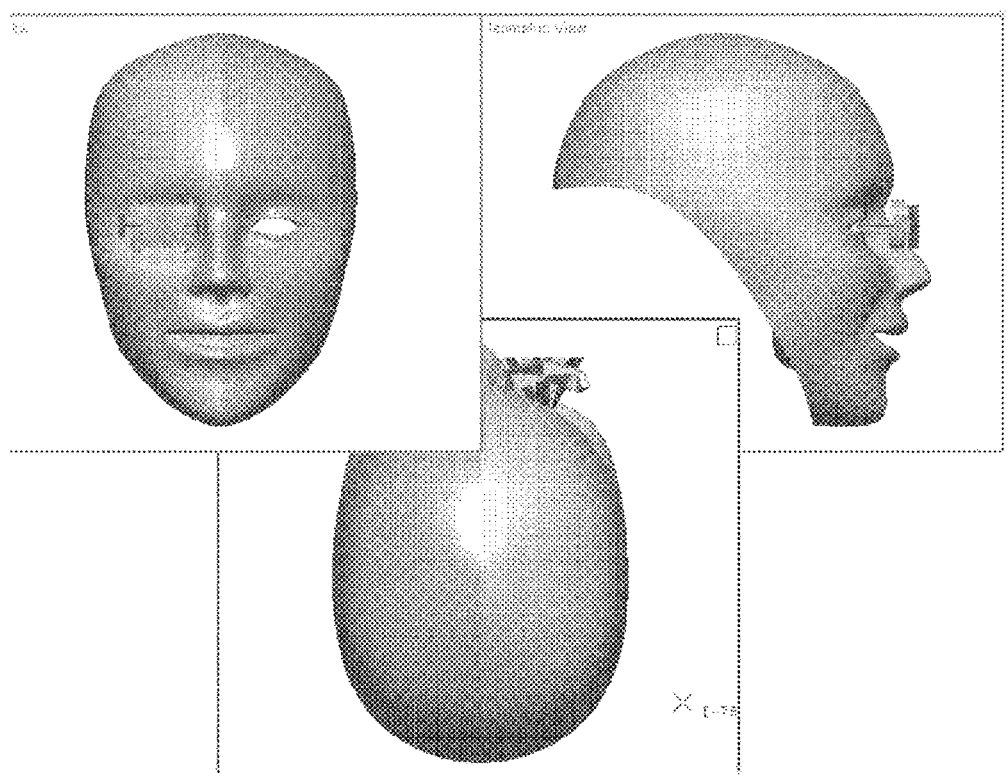
FIG. 14 is a schematic view showing the tiled head-mounted display system for augmented environment according to the present invention wore by a user.

FIG. 14 is a schematic view showing the tiled head-mounted display system for augmented environment according to the present invention wore by a user. As shown in FIG. 14, the tiled head-mounted display system for augmented environment according to the present invention can be used as a single ocular system for just one eye. Alternatively, it could also be used as a binocular head-mounted display system for both eyes.

The optical tiled head-mounted display device according to the present invention is compact and lightweight, and the exit pupil planes of all display channels are coincident, thus avoiding pupil aberration and keeping pupil diameter and eye clearance constant. Furthermore, there is no resolution variation in the field of view, thus preventing additional distortion. The tiled head-mounted display device according to the present invention can be readily applicable to augmented reality. In comparison, for a conventional head-mounted display device to be used in augmented reality, it is necessary to introduce a semi-reflective semi-transmissive mirror into the device to fold optical path in order to achieve optical transmission, thus requiring a complex and bulky structure.

Furthermore, the surfaces of the prisms according to the present invention for optical tiling can be formed continuous together as larger optical surfaces, they can be fabricated in one time and thus it does not require additional processing for the tiling surface. In addition, all optical surfaces of the prisms of the display channels in the head-mounted display device can be formed integrally, thus reducing difficulty and complexity of the tiling process.

The invention being thus described, it will be obvious that the same may be varied and modified in many ways. Such variations and modification are not to be regarded as a departure from the spirit and scope of the invention, and all such variation and modifications as would be obvious to those skilled in the art are intended to be included within the scope of the following claims.

What is claimed:
1. A tiled head-mounted display device, comprising:
a plurality of prisms with free-form surfaces, each prism being a wedge prism comprising a first optical surface, a second optical surface and a third optical surface; and
a plurality of micro-displays, each micro-display associated with a respective one of the plurality of prisms with free-form surfaces, a selected two of the plurality of micro-displays oriented facing each other with the plurality of prisms disposed therebetween;
wherein each prism with free-form surfaces and the associated micro-display constitutes a display channel, and a global coordinate system is defined as: a global coordinate origin O is at an exit pupil center; Z-axis is in a direction along the viewing axis of a user's eye; Y-axis is perpendicular to Z-axis and extends right above the eye; X-axis is perpendicular to both Y-axis and Z-axis, constituting a Cartesian coordinate system; and
an auxiliary lens with free-form surfaces disposed in optical communication with the plurality of prisms with free-form surfaces to allow user to see through the tiled head-mounted display device to observe an outside real-world scene, whereby an augmented environment is provided,
wherein the display channels are tiled so that an overall field of view of the tiled device is a summation of individual fields of view of each display channel and the center of an exit pupil of each display channel in the tiled device is located at the exit pupil center at the global coordinate origin O.

2. The tiled head-mounted display device of claim 1, wherein a horizontal field of view is at least 50° and a vertical field of view is at least 40°.

3. The tiled head-mounted display device of claim 1, wherein the auxiliary lens includes a material with a refractive index, $N_{d1}$, of $1.4 < N_{d1} < 1.8$.

4. The tiled head-mounted display device of claim 1, wherein the auxiliary lens includes a material with an Abbe number $V_{d1}$ above 20.

5. The tiled head-mounted display device according to claim 1, wherein the exit pupil diameter is at least 6 mm.

6. The tiled head-mounted display device according to claim 1, wherein the eye clearance is at least 15 mm.

7. The tiled head-mounted display device of claim 1, wherein a material used in the plurality of prisms with free-form surfaces has a refractive index, $N_{d1}$, of $1.4 < N_{d1} < 1.8$ and an Abbe number $V_{d1}$ above 20.

8. The tiled head-mounted display device of claim 1, wherein each one of the plurality of prisms with free-form surfaces has a first order focal length, f, of 14 mm<f<27 mm.

* * * * *